United States Patent [19]
Hashimoto et al.

[11] Patent Number: 5,912,697
[45] Date of Patent: Jun. 15, 1999

[54] VIDEO MAIL SYSTEM CAPABLE OF TRANSFERRING LARGE QUANTITIES OF DATA WITHOUT HAMPERING OTHER DATA TRANSMISSIONS

[75] Inventors: Shinichi Hashimoto, Hadano; Yuuji Kimura, Yokohama; Itaru Nonomura, Tokyo; Takahiro Yamada, Yokohama; Kazuhiro Fujisaki, Ebina; Kazuaki Tanaka, Yokohama, all of Japan

[73] Assignee: Hitachi, Ltd., Tokyo, Japan

[21] Appl. No.: 08/545,892

[22] Filed: Oct. 19, 1995

[30] Foreign Application Priority Data

Oct. 19, 1994 [JP] Japan .................................. 6-253773

[51] Int. Cl.$^6$ ........................................... H04N 7/10
[52] U.S. Cl. ..................... 348/12; 395/200.49; 358/402
[58] Field of Search .................... 348/12, 13, 6, 348/7, 426; 395/200.47, 200.49; 358/402, 433

[56] References Cited

U.S. PATENT DOCUMENTS

| | | | |
|---|---|---|---|
| 4,051,510 | 9/1977 | Cochran | 358/28 |
| 4,152,068 | 5/1979 | Bickl et al. | 355/38 |
| 4,651,206 | 3/1987 | Ohki | 358/136 |
| 4,654,484 | 3/1987 | Reiffel et al. | 379/53 |
| 4,701,923 | 10/1987 | Fukasawa | 371/41 |
| 4,870,497 | 9/1989 | Chamzas et al. | 358/426 |
| 4,979,174 | 12/1990 | Cheng et al. | 371/41 |
| 5,027,400 | 6/1991 | Baji et al. | 380/20 |
| 5,128,776 | 7/1992 | Scorse et al. | 358/426 |
| 5,138,447 | 8/1992 | Shen et al. | 358/133 |
| 5,150,432 | 9/1992 | Ueno et al. | 382/56 |
| 5,228,028 | 7/1993 | Cucchi et al. | 370/94.1 |
| 5,247,591 | 9/1993 | Baran | 382/61 |
| 5,260,783 | 11/1993 | Dixit | 358/136 |
| 5,293,250 | 3/1994 | Okumara et al. | 358/402 |
| 5,327,247 | 7/1994 | Osborne et al. | 348/100 |
| 5,386,297 | 1/1995 | Tanaka et al. | 358/402 |
| 5,410,553 | 4/1995 | Choon | 371/31 |
| 5,426,513 | 6/1995 | Scorse et al. | 358/433 |
| 5,432,871 | 7/1995 | Novik | 382/232 |
| 5,453,997 | 9/1995 | Roney, IV | 371/41 |
| 5,510,844 | 4/1996 | Cash et al. | 348/426 |
| 5,528,284 | 6/1996 | Iwami et al. | 348/13 |
| 5,557,320 | 9/1996 | Krebs | 348/13 |
| 5,574,934 | 11/1996 | Mirashrafi et al. | 348/12 |

FOREIGN PATENT DOCUMENTS

| | | | |
|---|---|---|---|
| 4-258056 | 9/1992 | Japan . | |
| 4-263545 | 9/1992 | Japan . | |
| 5-227517 | 9/1993 | Japan | H04N 7/133 |

*Primary Examiner*—Victor R. Kostak
*Attorney, Agent, or Firm*—Antonelli, Terry, Stout & Kraus, LLP

[57] ABSTRACT

In a data transfer system, a transmission terminal is provided with a transmission unit and a divisional transmission unit. A server station is provided with mailboxes, a transmission/reception management unit, a divisional reception unit and a divisional transmission unit. A reception terminal is provided with a reception/reconstruction unit and a divisional reception unit. In the transmission of video mail from the transmission unit (or from the transmission/reception management unit) to the transmission/reception management unit (or to the reception/reconstruction unit), audio and a frame (still picture) representative of a motion picture, among data contained in the video mail, are first sent by an ordinary method. Video data in the video mail are thereafter transmitted from the divisional transmission unit to the divisional reception unit by a plurality of separate operations. Such a construction can realize data transfer of the video mail which relieves traffic in multimedia data transmission and also copes with the urgency of the mail while making the best use of an existing network.

30 Claims, 12 Drawing Sheets

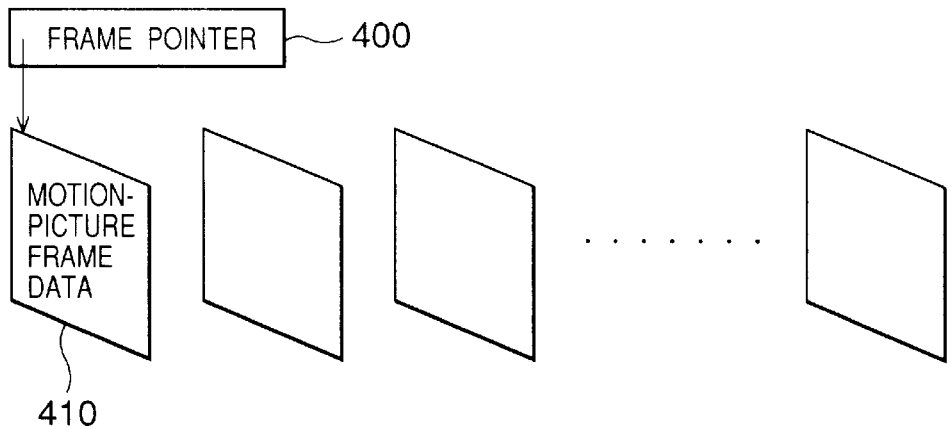
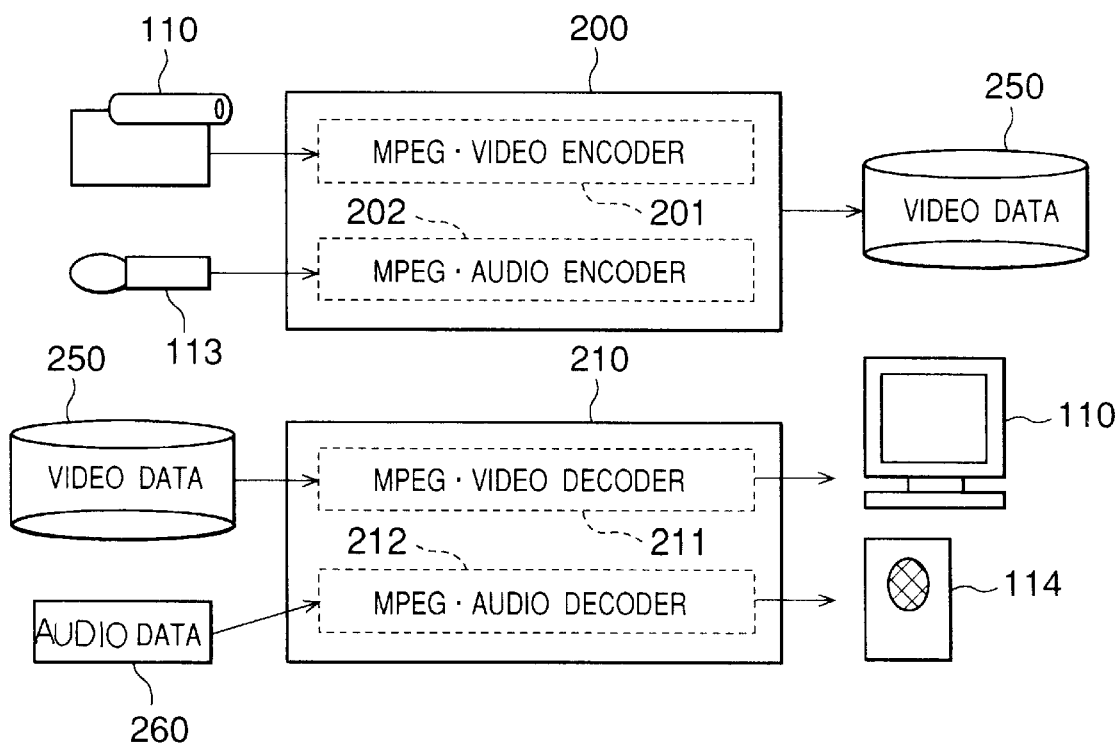
FIG.4

VIDEO MAIL SYSTEM CAPABLE OF TRANSFERRING LARGE QUANTITIES OF DATA WITHOUT HAMPERING OTHER DATA TRANSMISSIONS

FIELD OF THE INVENTION

The present invention relates to an electronic mail system, and more particularly to a data transfer system for video mail wherein video data composed of a motion picture, audio, etc. are sent as electronic mail.

RELATED ART

In general, a computer network system is so constructed that personal computers (hereinbelow, abbreviated to "PC's") and workstations (hereinbelow, abbreviated to "WS's") are interconnected by a communication medium such as a public network or a local area network (hereinbelow, abbreviated to "LAN"). In such a computer network system, the aspect of use of transferring multimedia data composed of motion pictures, still pictures, audios, etc. has recently increased. Incidentally, application programs (hereinbelow, abbreviated to "AP's") for handling the multimedia data include video mail, etc.

In this regard, when such multimedia data based on the multimedia AP are to be transmitted as they are, by the use of the LAN or the like having hitherto been introduced and laid, problems as stated below are involved. As compared with the multimedia AP, a conventional AP suffices with a smaller quantity of data to-be-transferred. With the conventional AP, therefore, even when a plurality of users access the network at the same time, the traffic of the network is not increased to the extent of being a heavy burden to the transmission capability thereof. It is also possible to use the network after establishing the aspect of operation which does not incur the increase in the traffic. In contrast, the multimedia AP handles the enormous quantities of multimedia data. Therefore, when the multimedia data are directly caused to flow through the hitherto network, the traffic is increased more than is conjectured by a user, and a transmission delay, etc. occur. As a result, adverse effects are exerted on, not only the data transmission conformed to the multimedia AP, but also the conventional data communications. Especially serious is the adverse effect on the data communication of which real-time processing within a limited transmission time has hitherto been required.

Techniques to be stated below by way of example have been proposed with an intention of solving the above problems.

The official gazette of Japanese Patent Application Laid-open (KOKAI) No. 4-263545 discloses the technique wherein, when file data to be transmitted exceed a predetermined quantity, the file data are divided into a plurality of blocks, which are separately transferred at delayed intervals by a plurality of operations. This technique can prevent a communication channel from being occupied for a long time period by a certain terminal.

Besides, the technique "MIME (Multipurpose Internet Mail Extensions)" disclosed in "RFC (Request For Comment) 1341" consists of a multimedia mail system which sends only information called "enclosure" describing whether or not data (for example, motion picture data) other than text data are contained in an item of mail. With this mail system, the information such as motion picture is received from a sender or addresser by a receiver or addressee only when needed. Therefore, data which are actually transmitted are limited only to those judged to be really necessary by the receiver, and the increase in the traffic can be suppressed to the required minimum.

When the technique disclosed in the official gazette of Japanese Patent Application Laid-open (KOKAI) No. 4-263545 is applied, a transfer of file data from a terminal can be interrupted with increased chances for data packets of other terminals. Accordingly, even when a transmission medium being currently widespread, such as "Ethernet", is used as it is, congestion ascribable to the occupation of the transmission medium by a certain terminal can be avoided. On the other hand, however, the technique poses a problem that a time period for transferring the overall file data becomes longer than before. In other words, such a data transfer system is effective only for the network AP (for example, video mail) executing the data transmission of which the real-time property is not eagerly required though the large quantities of data are handled. In spite of the effect, when the number of users enlarges, the data transfer time in the case of using the network AP might lengthen more. Besides, the technique is not satisfactory from the standpoint of coping with an urgent item of mail.

Further, the technique "MIME" is such that ordinary mail systems disclosed in "RFC 822" etc. are merely expanded to multimedia mail. This technique does not especially refer to the protocol etc. of the transfer. It also does not mention measures against that increase of the traffic which arises in a case of actually sending information such as motion picture.

SUMMARY OF THE INVENTION

An object of the present invention is to provide a data transfer system which is permitted to transfer large quantities of data without hampering data transmissions of hitherto network applications (in particular, data transmission requiring a real-time property) while employing an existing computer network system as it is.

Another object of the present invention is to provide a video mail system which is permitted to cope with an urgent item of mail while employing an existing computer network system as it is.

Still another object of the present invention is to provide a video-mail data transfer system and a video mail system which are applicable to an existing computer network system.

The present invention has been made in order to accomplish the above objects. In the first aspect of performance of the present invention, there is provided a data transmission device as a data source by which data to-be-transmitted composed of one or more sorts of data are transmitted to a data reception device as a data sink connected with the data transmission device through a network, comprising extraction means for extracting some of the data to-be-transmitted in conformity with a predetermined standard; advance data creation means for creating advance data which are formed containing the data extracted by the extraction means; transmission means for transmitting the advance data to the data reception device; and divisional transmission means for separately transmitting divisional transmission data to the data reception device by a plurality of operations, the divisional transmission data containing data which are not contained in the advance data in spite of being contained in the data to-be-transmitted.

The advance data should preferably contain link information which specifies the divisional transmission data corresponding to the advance data, in addition to the extracted data.

The data to-be-transmitted contain data of a motion picture which is formed containing, for example, data of a plurality of still pictures; and the extracted data contain some of the still picture data.

It is also allowed that the data to-be-transmitted contain video data which are formed containing data of a motion picture and data of audios, the motion picture being formed containing data of a plurality of still pictures; and that the extracted data contain the audio data and some of the still picture data.

The predetermined criteria may well be stipulated containing at least one of a type of data to be extracted, a position of the data to be extracted, and selection by a user of the data transmission device. Further, selection means for accepting the selection by the user may well be comprised.

It is preferable that the data to-be-transmitted contain data of a motion picture which is formed containing data of a plurality of still pictures; and that the selection means reproduces the motion picture data to present the motion picture to the user, and that accepts from the user the selection of at least one of the still pictures which are contained in the presented motion picture.

It is preferable that the data transmission device further comprises divisional-transmission-request acceptance means for accepting a request for divisional-transmission of data, from the data reception device; the divisional transmission means starting the divisional transmission of the divisional transmission data in a case where the divisional-transmission-request acceptance means has accepted the request for the divisional-transmission of data.

Preferably, a quantity of data which the divisional transmission means sends by each of the plurality of operations in the divisional transmission is, at most, a predetermined maximum data size. In this case, the data transmission device should preferably further comprise data size determination means for determining the quantity of data to be sent by the each operation, on the basis of the following formula:

$$d_p = \frac{V_L \cdot (t_c - t_e)}{8}$$

where $d_p$: quantity of data to be sent by the each operation (in bytes), $V_L$: transmission rate of the network (in bits/sec), $t_c$: predetermined allowable time of delays in communications which are made through the network (in sec), and $t_e$: marginal time which is preset by a user of the data transmission device (in sec), under a condition of te>0.

Preferably, the divisional transmission means makes the transmissions of the respective operations in the divisional transmission at time intervals each of which is not shorter than a transfer interval determined separately. In this case, the data transmission device should preferably further comprise transfer interval determination means for determining the transfer interval on the basis of the following formula:

$$t_d = t_i + 8 \cdot d_p \cdot \frac{C}{V_d}$$

where $t_d$: transfer interval (in sec), $V_d$: assigned transmission bandwidth of the network as is available for the divisional transmission (in bits/sec), $d_p$: quantity of data which the divisional transmission means sends by the each operation (in bytes), C: number of the data transmission devices which are concurrently transmitting the divisional transmission data at a predetermined time point obtained separately (in sets), and $t_i$: time period for which no data communication of the network is detected.

In the second aspect of performance of the present invention, there is provided a data reception device for receiving data which are sent from the first-mentioned data transmission device connected with the data reception device through a network, comprising reception means for receiving the advance data which are sent from the transmission means of the data transmission device; divisional reception means for receiving the data which the divisional transmission means of the data transmission device sends separately by the plurality of operations, and for putting the received data together to re-form the divisional transmission data; and memory means for storing the re-formed divisional transmission data therein.

In the third aspect of performance of the present invention, there is provided a data reception device for receiving data which are sent from the second-mentioned data transmission device, comprising reception means for receiving the advance data which are sent from the transmission means of the data transmission device; divisional reception means for receiving the data which the divisional transmission means of the data transmission device sends separately by the plurality of operations, and for putting the received data together to re-form the divisional transmission data; and memory means for storing the re-formed divisional transmission data therein.

In the fourth aspect of performance of the present invention, there is provided a data reception device for receiving data which are sent from the above-mentioned data transmission device and as to which the divisional transmission data (and the link information) are contained in the advance data, comprising reception means for receiving the advance data which are sent from the transmission means of the data transmission device; divisional reception means for receiving the data which the divisional transmission means of the data transmission device sends separately by the plurality of operations, and for putting the received data together to re-form the divisional transmission data; and reconstruction means capable of reconstructing the motion picture data and the still picture data.

In the fifth aspect of performance of the present invention, there is provided a data reception device for receiving data which are sent from the above-mentioned data transmission device, comprising reception means for receiving the advance data which are sent from the transmission means of the data transmission device; divisional reception means for receiving the data which the divisional transmission means of the data transmission device sends separately by the plurality of operations, and for putting the received data together to re-form the divisional transmission data; and reconstruction means capable of reconstructing the still picture data, the motion picture data and the audio data.

In this case, it is preferable that, in reconstructing the audio data contained in the advance data, the reconstruction means is capable of displaying the still picture data contained in the advance data, concurrently with the reconstruction of the audio data.

In each of the second through fifth aspects of performance, the data reception device should preferably further comprise divisional-transmission request means for sending the data transmission device a request for divisional transmission of the divisional transmission data which correspond to the advance data.

In sending the request for execution of the divisional transmission, the divisional-transmission request means may also send the link information contained in the advance data.

In this case, the data reception device may well further comprise reconstruction instruction acceptance means for accepting an instruction from a user for reconstructing the motion picture data which correspond to the advance data; save means for saving the divisional transmission data; and control means; the divisional reception means storing the re-formed divisional transmission data in the save means; the control means deciding if the divisional transmission data corresponding to the advance data exist in the save means, when the reconstruction instruction means has accepted the instruction of reconstructing the motion picture data; so that subject to the nonexistence of the divisional transmission data in the save means, the control means causes the divisional-transmission request means to send the request for divisional transmission to the data transmission device and thereafter causes the reconstruction means to reconstruct the motion picture data contained in the divisional transmission data received by the divisional reception means; whereas subject to the existence of the divisional transmission data in the save means, the control means causes the reconstruction means to reconstruct the motion picture data contained in the divisional transmission data in the save means.

Moreover, the data reception device should preferably further comprise transfer-state notification means for notifying that the divisional transmission data are being received, to a user of the data reception device for a time period from the sending of the divisional transmission request by the divisional-transmission request means, until completion of the reception of the divisional transmission data by the divisional reception means.

In another aspect of performance of the present invention, there is provided a video mail system wherein video mail is transferred from a transmission terminal to a reception terminal through a server station; the transmission terminal comprising extraction means for extracting still picture data according to a predetermined criteria, the still picture data being some of motion picture data contained in the video mail to-be-transmitted; advance data creation means for creating advance data which are formed containing the still picture data extracted by the extraction means, and link information for specifying the motion picture data corresponding to the still picture data; transmission means for transmitting the advance data to the server station; and divisional transmission means for separately transmitting divisional transmission data to the server station by a plurality of operations, the divisional transmission data containing the motion picture data of the video mail to-be-transmitted; the server station comprising reception means for receiving the advance data which are sent from the transmission means of the transmission terminal; divisional reception means for receiving data which the divisional transmission means of the transmission terminal sends separately by the plurality of operations, and for putting the received data together to re-form the divisional transmission data; memory means for storing the re-formed divisional transmission data therein, along with the corresponding advance data; transmission means for transmitting the advance data to the server station in response to a request sent from the reception terminal; and divisional transmission means for separately transmitting the re-formed divisional transmission data in the memory means, to the reception terminal by a plurality of operations in response to a request made by a user of the reception terminal; the reception terminal comprising first request means for requesting the server station to transmit the advance data; reception means for receiving the advance data which are sent from the transmission means of the server station; still picture reconstruction means for reconstructing the still picture which is contained in the received advance data; means for inquiring of the user as to if the user desires reception of the motion picture corresponding to the still picture, during the reconstruction of the still picture; second request means for requesting the server station to transmit the divisional transmission data which contain the motion picture data corresponding to the still picture, in a case where the user desires the reception of the motion picture; divisional reception means, for receiving the data which the divisional transmission means of the server station sends separately by the plurality of operations in response to a request from the second request means, and for putting the received data together to re-form the divisional transmission data; memory means for storing the re-formed divisional transmission data therein; and motion picture reconstruction means for reconstructing the motion picture data stored in the memory means.

In the video mail system, the transmission means included in the transmission terminal sends destination information indicating the user who is to receive the advance data, along with the advance data; the memory means included in the server station stores the advance data and the destination information in association with each other therein; the reception terminal further includes arrival check means for inquiring as to if the video mail directed to the certain user exists in the memory means; and the server station further includes arrival reply means for verifying if the video mail directed to the user exists in the memory means, and for sending a result of the verification to the reception terminal as a reply, in a case where the inquiry is received.

It is further allowed that the video mail also contains audio data, that the extraction means extracts the audio data in addition to the still picture data, and that the advance data creation means adds the audio data to the advance data.

In another aspect of performance of the present invention, there is provided a data transfer method of transferring data to-be-transmitted which are composed of data of one or more sorts of contents, comprising the steps of extracting some of the data contained in the data to-be-transmitted, according to a predetermined criteria; creating advance data formed containing the extracted data, and sending the advance data to a transfer destination in advance; and thereafter sending divisional transfer data separately by a plurality of operations, the divisional transfer data containing data which are not contained in the advance data in spite of being contained in the data to-be-transmitted.

The advance data should preferably contain link information which specifies the divisional transfer data corresponding to the advance data, in addition to the extracted data.

It is also allowed that the data to-be-transmitted contain data of a motion picture which is formed containing data of a plurality of still pictures; and that the extracted data are formed containing some of the still picture data. Alternatively, it is also allowed that the data to-be-transmitted contain video data which are formed containing data of a motion picture and data of audios, the motion picture being formed containing data of a plurality of still pictures; and that the extracted data are formed containing the audio data and some of the still picture data.

In still another aspect of performance of the present invention, there is provided a video mail transfer method of transferring video mail which contains, at least, data of a motion picture formed containing data of a plurality of still pictures, comprising the steps of extracting some of the still picture data contained in the motion picture data; creating advance data which are formed containing, at least, the extracted still picture data, and link information indicating the video data, the still picture data belonging to the video data; transferring the advance data and destination information in advance, the destination information designating t hat user of the video mail transfer method who is to receive the advance data; and thereafter transferring data separately by a plurality of operations, the data containing data which are not contained in the advance data in spite of being contained in the video mail.

In operation, the extraction means extracts some of the data to-be-transmitted that should be contained in the advance data, according to the predetermined criteria (for example, a type of data to be extracted, a position of the data to be extracted, or/and a selection by the user). In the case where the "user selection" is contained as the criteria of the extraction, it is accepted by the selection means. In the case where the data to-be-transmitted contain the motion picture data, the video data or the likes, the extraction data should preferably contain some of the still picture data, and further the audio data. The reasons therefor are that such still picture data and audio data suffice with comparatively small quantities of data, and that the required minimum communication is thought to be realized. In this case, the selection by the selection means is facilitated when done while the motion picture data are being reproduced. In the case where the position of the data to be extracted is adopted as the criteria, the first or last one of the still pictures constituting the motion picture data may well be extracted by way of example.

The advance data creation means creates the advance data which are formed containing the extraction data, the link information, etc. In a case where text data are contained in the data to-be-transmitted, they may well be also contained in the advance data.

The transmission means transmits the advance data to the data reception device through the network.

Thereafter, when the divisional-transmission-request acceptance means accepts the request for divisional transmission as sent from the data reception device, the divisional transmission means starts the divisional transmission. That is, the divisional transmission data are separately transmitted by the plurality of operations.

In this case, when the video data or the likes are contained in the data to-be-transmitted, the network would be occupied for a long time period. Since such a state is not favorable, the data size determination means determines the quantity $d_p$ of data which the divisional transmission means sends by each of the plurality of operations, in accordance with the first-mentioned formula by way of example lest the quantity $d_p$ should exceed the predetermined maximum data size.

Moreover, from the same viewpoint, the respective transmitting operations in the divisional transmission should preferably be performed at the time intervals each of which is not shorter than the transfer interval which the transfer interval determination means determines in accordance with the second-mentioned formula by way of example.

On the other hand, the data reception device receives the advance data sent from the transmission means of the data transmission device, by the reception means. Thereafter, the user instructs the reconstruction means to reconstruct and display the audio data and the still picture data which are contained in the advance data.

The reconstruction instruction means accepts from the user an instruction of reconstructing the motion picture data which correspond to the certain advance data. Then, the control means decides whether or not the divisional transmission data corresponding to the pertinent advance data exist in the save means.

In the case where, as the result of the decision, the divisional transmission data do not exist, the control means causes the divisional-transmission request means to send the request for divisional transmission and the link information to the data transmission device. The transfer-state notification means notifies the user that the divisional transmission data are being received, for the time period from the sending of the execution request by the divisional-transmission request means, until the completion of the reception of the divisional transfer data by the divisional reception means. The divisional reception means receives the data coming through the divisional transmission, and it puts the received data together to re-form the divisional transmission data. In some cases, the re-formed data are saved in the save means. Besides, the control means causes the reconstruction means to reconstruct or play back the motion picture data or the video data contained in the re-formed divisional transmission data.

In contrast, in the case where the divisional transmission data exist, the control means immediately causes the reconstruction means to reconstruct or play back the motion picture data or the video data contained in the existing divisional transmission data in the save means.

In the case of the application to the video mail system, the transmission means of the transmission terminal sends the destination information indicating the receiver of the data, along with the advance data. The server stores the destination information and the video mail (the advance information and the divisional transmission data) in the memory means in association with each other. In the case where the arrival verification means of the reception terminal has inquired about the arrival, the arrival reply means of the server replies to the inquiry.

Incidentally, that start of the divisional transmission which is effected by the delivery and acceptance of the divisional-transmission request between the divisional-transmission request means and the divisional-transmission-request acceptance means may well be applied only between the server and the reception terminal. Insofar as no physical inconvenience is involved, the divisional transmission is automatically performed between the transmission terminal and the server after the transmission of the advance data.

BRIEF DESCRIPTION OF THE DRAWINGS

FIG. 3 is an explanatory diagram showing the frame structure of a motion picture in an embodiment;

FIG. 4 is an explanatory diagram showing the outlines of video data compression and expansion processes in an embodiment;

DETAILED DESCRIPTION OF THE PREFERRED EMBODIMENTS

Now, an embodiment of the present invention will be described with reference to the drawings.

This embodiment is an example in which the present invention is applied to a video mail system based on motion picture data of "MPEG (Moving Picture coding Experts Group)" format.

In this specification, "video data" shall be formed containing motion picture data and audio data. In order to indicate the status (compressed/expanded) of the video data, the video data in the compressed status will be especially called "compressed video data" in some cases. Likewise, the motion picture data and the audio data in the compressed status will be sometimes called "compressed motion picture data" and "compressed audio data", respectively.

Also, "video mail" shall be electronic mail which is constructed containing video data. The video mail may well contain text data etc. in addition to the video data.

Figure 1:
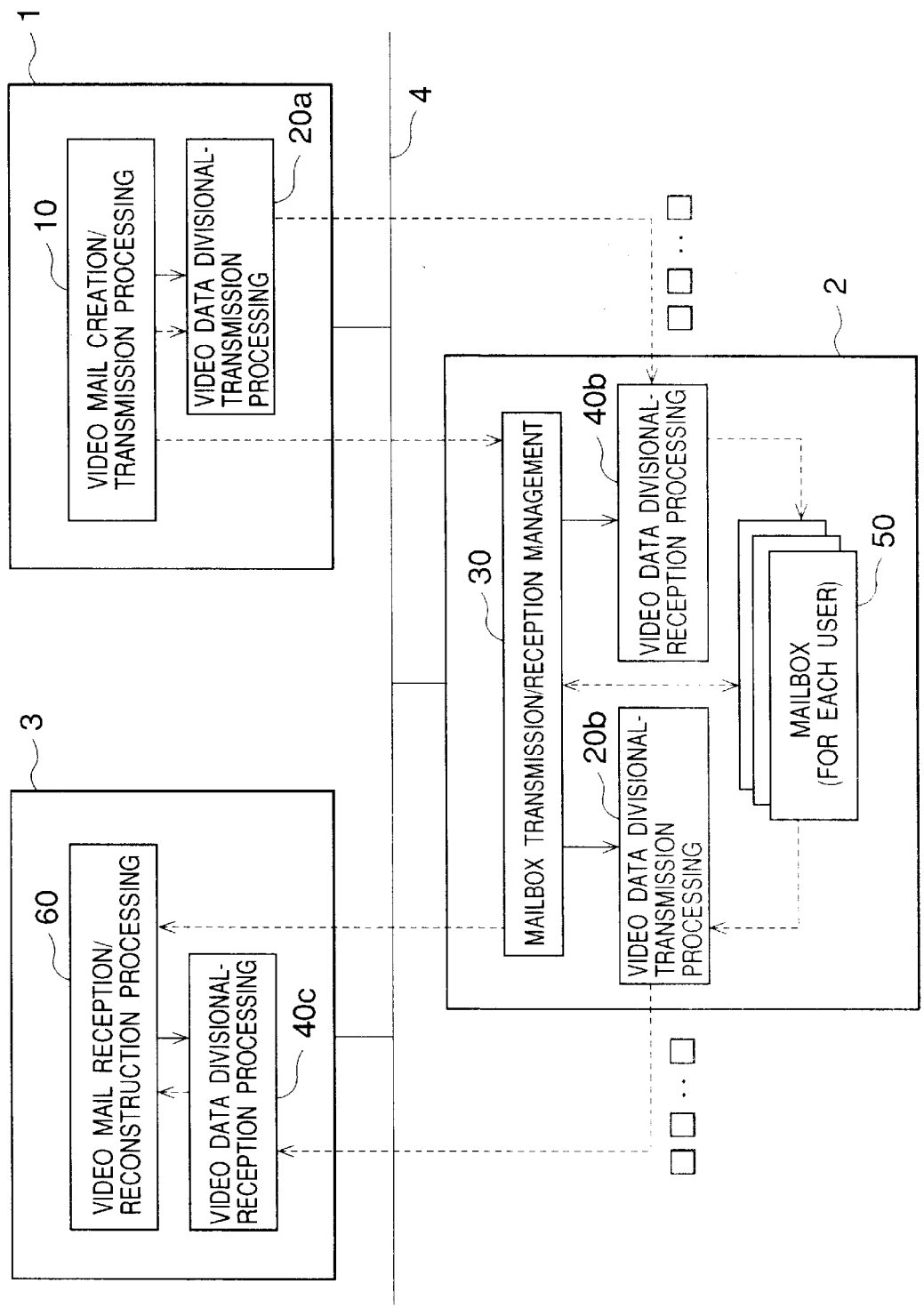
FIG. 1 is a block diagram showing the architecture and functions of a video mail system which is an embodiment of the present invention.

First, the architecture and functional scheme of the system of this embodiment will be outlined with reference to FIG. 1. Incidentally, solid lines in the figure indicate the flows of controls, and broken lines the flows of data.

The system illustrated in FIG. 1 comprises a video mail transmission terminal 1 as a data source, a mailbox server station 2, a video mail reception terminal 3 as a data sink, and a network 4 which interconnects the constituents 1–3.

The video mail transmission terminal 1 serves for acceptance of video data for an item of video mail, creation and transmission processing for mail data, etc. The video mail transmission terminal 1 is constructed including a video mail creation/transmission processing module 10 and a video data divisional-transmission processing module 20a. The video mail creation/transmission processing module 10 serves for creation and transmission of the item of video mail. The video data divisional-transmission processing module 20a serves to divide a large quantity of data, such as the video data, into data blocks of small size, and to transfer the data blocks at time intervals.

The mailbox server station 2 includes mailboxes 50 in each of which the items of video mail of a corresponding receiver or addressee (user) are collectively held once. The mailbox server station 2 is constructed including a video data divisional-transmission processing module 20b, a mailbox transmission/reception management module 30, a video data divisional-reception processing module 40b, and the mailboxes 50 mentioned above. The video data divisional-transmission processing module 20b is essentially the same as the video data divisional-transmission processing module 20a which is disposed in the video mail transmission terminal 1. The mailboxes 50 for accumulating the items of video mail are uniquely associated with the individual users who use the video mail system. The mailbox transmission/reception management module 30 serves to manage the mailboxes 50. The video data divisional-reception processing module 40b receives the divided data blocks sent from the divisional-transmission processing module 20a, and joins the data blocks to re-form the original data. The re-formed data are stored in the corresponding mailbox 50.

By the way, in the ensuing description, the video data divisional-transmission processing module 20a and the video data divisional-transmission processing module 20b will be generically and simply named the "video data divisional-transmission processing module 20" in some cases. Likewise, the video data divisional-reception processing module 40b and a video data divisional-reception processing module 40c (which is disposed in the video mail reception terminal 3) will be generically and simply named the "video data divisional-reception processing module 40" in some cases.

The video mail reception terminal 3 serves for reception of an item of video mail (that is, the takeout of the item of video mail from the mailbox 50), and for reconstruction or playback of the item of video mail. The video mail reception terminal 3 includes the video data divisional-reception processing module 40c mentioned above, and a video mail reception/reconstruction processing module 60. The video data divisional-reception processing module 40c is essentially the same as the video data divisional-reception processing module 40b which is disposed in the mailbox server station 2. The video mail reception/reconstruction processing module 60 serves to sense the arrival of the item of video mail at the corresponding mailbox 50, the video mail item being addressed to the current user of the video mail reception terminal 3. This module 60 is also endowed with the functions of taking out the video mail item which has arrived, reconstructing or playing back the video mail item, and so forth.

The constituent devices 1–3 are interconnected by the network 4, and they can exchange data with one another through the network 4. This network 4 is, for example, a LAN or a public network.

In general, no user makes only the transmission of mail or only the reception thereof. Therefore, the functions of both the terminals 1 and 3 may well be bestowed on an identical terminal.

Operations in this embodiment will be outlined. Here, the operations will be explained separately on the creation and transmission of video mail and on the reception (takeout) and reconstruction of video mail.

(a) Creation and Transmission of Video Mail

First, a user creates an item of video mail owing to the function of the video mail creation/transmission processing module 10 at the video mail transmission terminal 1. After designating a destination of the video mail item, the user instructs the processing module 10 to transmit the video mail item. Incidentally, video data contained in the video mail item are ordinarily compressed at this point of time.

Then, the processing module 10 sends urgent data of high priority level (or data having a smaller quantity and exerting less influence on the network 4) among the constituent data of the video mail item, to the mailbox transmission/reception management module 30 of the mailbox server station 2 in advance in conformity with a conventional transfer method. It delivers the remaining data to the video data divisional-transmission processing module 20a so as to send them in conformity with the divisional transmission. The divisional size and transfer intervals of the data in the divisional transmission will be detailed later.

Hereinafter, the data which are transmitted from the processing module 10 in advance in conformity with the conventional transfer method shall be called the "advance data". In the present invention, the advance data are defined as data which can fulfill a certain degree of meaningful communication by themselves and whose data quantity is comparatively small in the constituent data of each item of video mail.

Besides, the data which are sent in conformity with the divisional transmission by the processing module 20a after the transmission of the advance data shall be called the "divisional transmission data" or "divided data blocks". The divisional transmission data are set as data which have a comparatively large quantity in the video mail data (and which are, for example, motion picture data, or data composed of a motion picture and audio).

Here in this embodiment, the advance data are composed of the audio data contained in the video data, and the data of the representative frame (still picture) of the motion picture contained in the video data. Besides, in the case where the text data are also contained in the data which are to be sent as the video mail item, the text data are also brought into the advance data. On the other hand, the video data (corresponding to compressed video data 250 to be explained later) are sent as the divisional transmission data. As regards the audio data, accordingly, the same content is sent twice.

Upon receiving the advance data sent, the mailbox transmission/reception management module 30 stores the advanced data in the mailbox 50 which is provided for the user (receiver or addressee) corresponding to the destination designated at the transmission terminal 1 by the user (transmitter or addresser). Besides, upon receiving a request for divisional transmission from the processing module 10 (the request itself is sent to the mailbox transmission/reception management module 30 by the processing module 10), the mailbox transmission/reception management module 30 requests the video data divisional-reception processing module 40b to execute a reception process for the divisional transmission data. The requested processing module 40b receives all the data divided and sent (all the divided data blocks) by the video data divisional-transmission processing module 20a and then joins the received data blocks into a single data file, to thereby re-form the divisional transmission data. Subsequently, the processing module 40b stores the data file in the mailbox 50 which is provided for the user corresponding to the destination of the video mail item. In the mailbox 50, the advance data and the divisional transmission data are separately stored and are not united with each other.

A method for detecting the end of the transfer of all the data in the mode of the divisional transmission is not especially restricted. By way of example, it is possible to apply a method in which the transfer is regarded as having ended, when a symbol (end-of-file) indicative of the tail of the data file has been detected in the transmitted or received divisional data. Alternatively, it is possible to apply a method in which the size of the data to be transferred is collated and decided on both the transmission side (transmission terminal 1) and the reception side (mailbox server station 2).

In such a system according to the present invention, the advance data and the divisional transmission data need to be correlated with each other beforehand. In this embodiment, they are correlated in the way that link information (link information 330 in FIG. 5), such as the ID or data file name of the divisional transmission data (herein, the video data), is incorporated in the advance data. The details of this contrivance will be explained with reference to FIG. 5 later.

(b) Reception and Reconstruction of Video Mail

When the user of the video mail reception terminal 3 has started the processing of the video mail reception/reconstruction processing module 60, this processing module 60 inquires of the mailbox transmission/reception management module 30 about the presence or absence of the arrival of any video mail item at the mailbox 50 of the current user of the pertinent reception terminal 3.

On condition that the mail item addressed to the particular user (receiver or addressee) has arrived, the management module 30 gives notice of the arrival to the user. The processing module 60 informs the user of the result. In a case where the user desires to read the mail item, he/she instructs the processing module 60 to take out the mail item.

The instructed processing module 60 requests the management module 30 to take out the video mail item. Then, the management module 30 first takes out the advance data from the mailbox 50 and sends the advance data to the processing module 60 in conformity with the conventional transfer method. The processing module 60 reconstructs or plays back the audio data contained in the sent advance data. Also, the module 60 displays the representative frame data contained in the advance data.

On this occasion, in a case where the user desires to watch (or read) the video data corresponding to the advance data, he/she gives the processing module 60 an instruction to that effect. Then, the processing module 60 notifies the mailbox transmission/reception management module 30 of the link information contained in the advance data and requests this module 30 to take out the divisional transmission data specified by the pertinent link information. The mailbox transmission/reception management module 30 causes the video data divisional-transmission processing module 20b to execute the divisional transmission of the specified divisional transmission data.

The processing module 60 causes the video data divisional-reception processing module 40c to execute the divisional reception of the specified divisional transmission data. The processing module 40c receives all the data divided and sent (all the divided data blocks) by the processing module 20b and then joins the received data blocks into a single data file, which is delivered to the processing module 60. This processing module 60 reconstructs or plays back the video data contained in the divisional transmission data.

Next, the hardware construction of the video mail transmission terminal 1 or the video mail reception terminal 3 will be described with reference to FIG. 2.

The terminal 1 or 3 in this embodiment is constructed including a central processing unit (CPU) 101, a main memory 102, a clock 103, a mouse 104, a keyboard 105, a storage device 106, a network controller (LAN board) 107, a picture input/output controller 108 furnished with a VRAM (Video RAM) 109, a display unit 110, a camera 111, an audio input/output controller 112, a microphone 113, a speaker 114, a compander 115 and a bus 116.

The CPU 101 controls the entirety of the terminal 1 or 3. The main memory 102 temporarily secures a table in which controlling data are held during the operation of a program. The clock 103 supplies interrupt signals and information on the date and hour to the CPU 101 etc. at fixed intervals. The storage device 106 for saving the data of the user is, for example, a hard disk drive (HD) or a magneto-optical disk drive (MO).

The mouse 104 and the keyboard 105 serve to enter the instruction inputs of the user.

The display unit 110 serves to present the displays of various processed results to the user. The camera 111 serves to pick up picture information. These constituents 110 and 111 are controlled by the picture I/O controller 108. The VRAM 109 holds therein data which are to be displayed on the display unit 110. The newest display data are normally written into the memory 109 by the controller 108.

The microphone 113 serves to pick up audio information. The speaker 114 serves to convey audio information to the user. These constituents 113 and 114 are controlled by the audio I/O controller 112. The network controller (LAN board) 107 is disposed for connecting the terminal 1 or 3 to the network 4.

The compander 115 serves to execute the compression/expansion processing of the video data. The video data have an enormous data quantity. It is therefore common practice that, in the case of accepting the video data at the terminal 1, the video data are digitized and compressed, the resultant data being temporarily stored or being directly transmitted, and that, in the case of reconstructing or playing back the video data at the terminal 3, the compressed data received are expanded. Among various techniques for the compression/expansion of video data, the MPEG system is adopted in this embodiment. Since a large quantity of calculations are involved in the MPEG system, the calculations for the compression and expansion are executed using the hardware elements of the compander 115, etc. in this embodiment. Besides, the compander 115 employed in this embodiment is capable of the compression/expansion processing even in a case where only either of motion picture data and audio data are contained.

It is also possible to execute the compression/expansion processing by means of software which operates through the main memory 102 and the CPU 101, without employing the compander 115. In this case, the hardware dedicated to the compression and expansion can be dispensed with. The structure etc. of the video data in the MPEG system will be explained later.

Incidentally, the hardware construction of the mailbox server station 2 may be similar to that of the terminal 1 or 3. As to the functions of the mailbox server station 2, however, it is also allowed to omit the picture I/O controller 108 with the VRAM 109, the display unit 110, the camera 111, the audio I/O controller 112, the microphone 113, the speaker 114 and the compander 115. The mailboxes 50 are constructed in the storage device 106.

The video mail creation/transmission processing module 10, the video data divisional-transmission processing modules 20a, 20b, the mailbox transmission/reception management module 30, the video data divisional-reception processing modules 40b, 40c, the mailboxes 50 and the video mail reception/reconstruction processing module 60, which are included in the architecture of FIG. 1, are implemented in such a way that the various portions explained with reference to FIG. 2 operate in close cooperations with one another.

The video mail creation/transmission processing module 10, for example, is implemented in such a way that, in compliance with an instruction entered from the mouse 104 etc., the CPU 101, picture I/O controller 108 and audio I/O controller 112 operate so as to accept the picture and audio data from the camera 111 and microphone 113, respectively. The accepted data are encoded by the compander 115. Thus, the item of video mail is created.

The video data divisional-transmission processing modules 20 are implemented in such a way that the CPU 101 runs programs stored in the memory 102. The user's instructions required for these processing modules are entered from the mouse 104 etc.

The video data divisional-reception processing modules 40 are implemented in such a way that the CPU 101 runs programs stored in the memory 102. The user's instructions required for these processing modules are entered from the mouse 104 etc. Besides, the received data are stored in the storage device 106 on occasion.

The video mail reception/reconstruction processing module 60 is implemented in such a way that, in compliance with an instruction entered from the mouse 104 etc., the CPU 101, compander 115 etc. operate to decode the received video data, whereupon the picture I/O controller 108 and audio I/O controller 112 deliver the decoded video data from the display unit 110 and speaker 114. Besides, the video data are saved on occasion by storing the data in the storage device 106.

Figure 7:
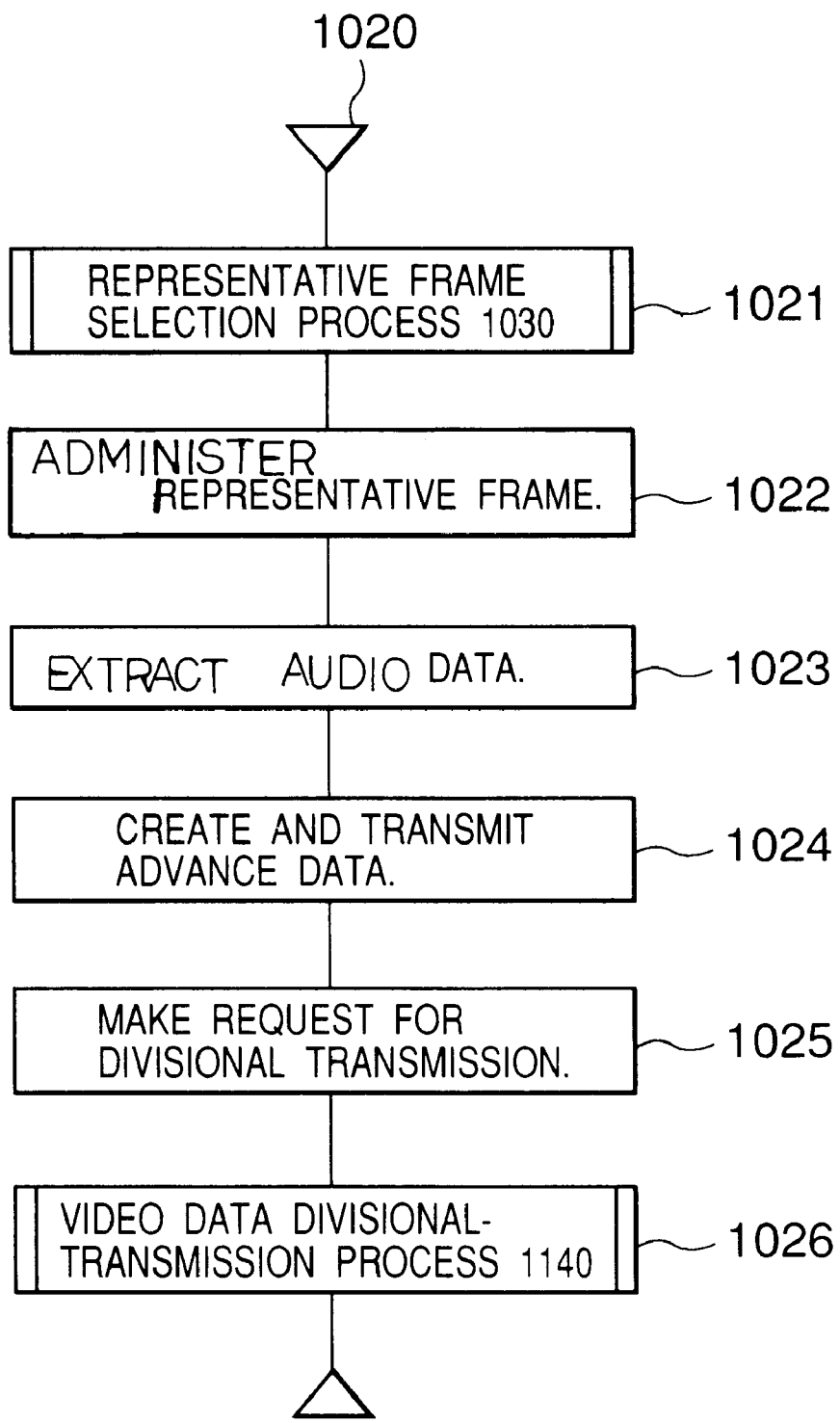
FIG. 7 is a flow chart showing a video mail transmission program which corresponds to a step 1015 in FIG. 6.

"Extraction means" mentioned in the appended claims is implemented by the video mail creation/transmission processing module 10, particularly by processing at steps 1022 and 1023 in FIG. 7.

"Advance data creation/transmission means" is implemented by the video mail creation/transmission processing module 10, particularly by processing at a step 1024 in FIG. 7. "Divisional transmission means" is implemented by the video data divisional-transmission processing module 20, particularly by the run of a divisional transmission process program 1140 in FIG. 12. "Selection means" is implemented by the video mail creation/transmission processing module 10, particularly by a representative frame selection program 1030 in FIG. 8. "Divisional-transmission-request acceptance means" is implemented by the mailbox transmission/reception management module 30, particularly by a step 1202 in FIG. 15 and steps 1211 and 1213 in FIG. 16. "Memory means" is implemented by the mailbox 50, particularly by the storage device 106 in FIG. 2. "Save means" is implemented by the video mail reception/reconstruction processing module 60, particularly by the storage device 106 in FIG. 2. "Divisional-transmission request means" is implemented by the video mail reception/reconstruction processing module 60, particularly by processing at a step 1133 in FIG. 11. "Reconstruction means" is implemented by the video mail reception/reconstruction processing module 60, particularly by processing at a step 1138 in FIG. 11. In FIG. 2, the "reconstruction means" is implemented including the picture I/O controller 108, display unit 110, compander 115, audio I/O controller 112 and speaker 114. "Reconstruction instruction means" corresponds to the mouse 104 and keyboard 105 for entering a video reconstruction request the presence or absence of which is judged at the step 1133 in FIG. 11. "Control means" is implemented by the video mail reception/reconstruction processing module 60, particularly by a series of processing at steps 1136 through 1138 in FIG. 11. "Transfer-state notification means" is implemented by the video mail reception/reconstruction processing module 60, particularly by those operations of the CPU 101 according to which a predetermined message is displayed and erased on the display unit 110 in correspondence with a step 1135 and the step 1137 in FIG. 11. "Arrival check means" is implemented by the reception/reconstruction processing module 60, particularly by a step 1111 in FIG. 9 and a step 1121 in FIG. 10. "Arrival reply means" is implemented by the mailbox transmission/reception management module 30, particularly by steps 1214 and 1215 in FIG. 16. "Data size determination means" and "transfer interval determination means" are implemented by the divisional-transmission processing module 20, particularly by steps 1142–1144 in FIG. 12.

"Data to-be-transmitted" correspond to the video data, text data etc. which are to be sent as the item of video mail. "Extracted data" correspond to the representative frame data and audio data which are extracted from the video data. "Link information" corresponds to the link information 330 in FIG. 5. "Destination information" indicates, e. g., the ID of the user who is the receiver or addressee of the mail item.

Next, the method of creating the advance data in this embodiment will be described.

Here will be first explained the outline and data structure of the MPEG system on which the creation of the advance data in this embodiment is premised. FIG. 3 illustrates the frame structure of motion picture data which are handled in this embodiment.

A motion picture is reconstructed and played back by displaying a plurality of still pictures successively at high speed, though this aspect is not limited to the MPEG system. The still pictures constituting the motion picture shall be called the "frame data" of the motion picture. That is, the motion picture data are basically formed as the set of the successive items of frame data 410. A frame pointer 400 points at the frame data of the motion picture data in a compressed (or non-compressed) status.

Methods of compressing data are broadly classified into an "intraframe compression" method and an "interframe compression" method. The intraframe compression is the technique in which redundancy within the data of a single frame is compressed. The interframe compression is the technique in which the difference of the data of each frame from those of a preceding or succeeding frame is held as data, to thereby compress the temporal redundancy of data.

In the MPEG system, both the compression methods are used. Therefore, the expansion and reconstruction of compressed motion picture data necessitate processing such as the addition of the differential data to the data of the preceding frame.

By the way, the "motion picture data", "audio data" and "video data" mentioned in this specification, especially in the appended claims, are concepts in which the data in compressed statuses as explained above are also covered.

The compression process and expansion process for video data in the MPEG system are outlined in FIG. 4.

A video data compression process algorithm 200 in the MPEG system is configured including an MPEG-Video encoder 201 for the compression process of motion picture data, and an MPEG•Audio encoder 202 for the compression process of audio data. The motion picture data accepted from the camera 111 are digitized and compressed into compressed motion picture data by the encoder 201. Likewise, the audio data accepted from the microphone 113 are encoded into compressed audio data by the encoder 202.

Subsequently, the compressed motion picture data and the compressed audio data are put together, whereby compressed video data 250 (refer to FIG. 5) are formed.

An expansion process algorithm 210 for compressed video data in the MPEG system is configured including an MPEG-Video decoder 211 for the expansion of motion picture data, and an MPEG-Audio decoder 212 for the expansion of audio data. The compressed motion picture data contained in the compressed video data 250 are expanded by the decoder 211. Subsequently, the expanded motion picture data are displayed by the display unit 110. Likewise, the compressed audio data 260 are expanded by the decoder 212, and the expanded audio data are re-formed and output by the speaker 114. In such a mode of reconstruction or playback, the audio and the motion picture are synchronized by a technique called "MPEG•System". Even in the presence of only the compressed audio data 260, the decoder 212 can expand and reconstruct the data.

Figure 5:
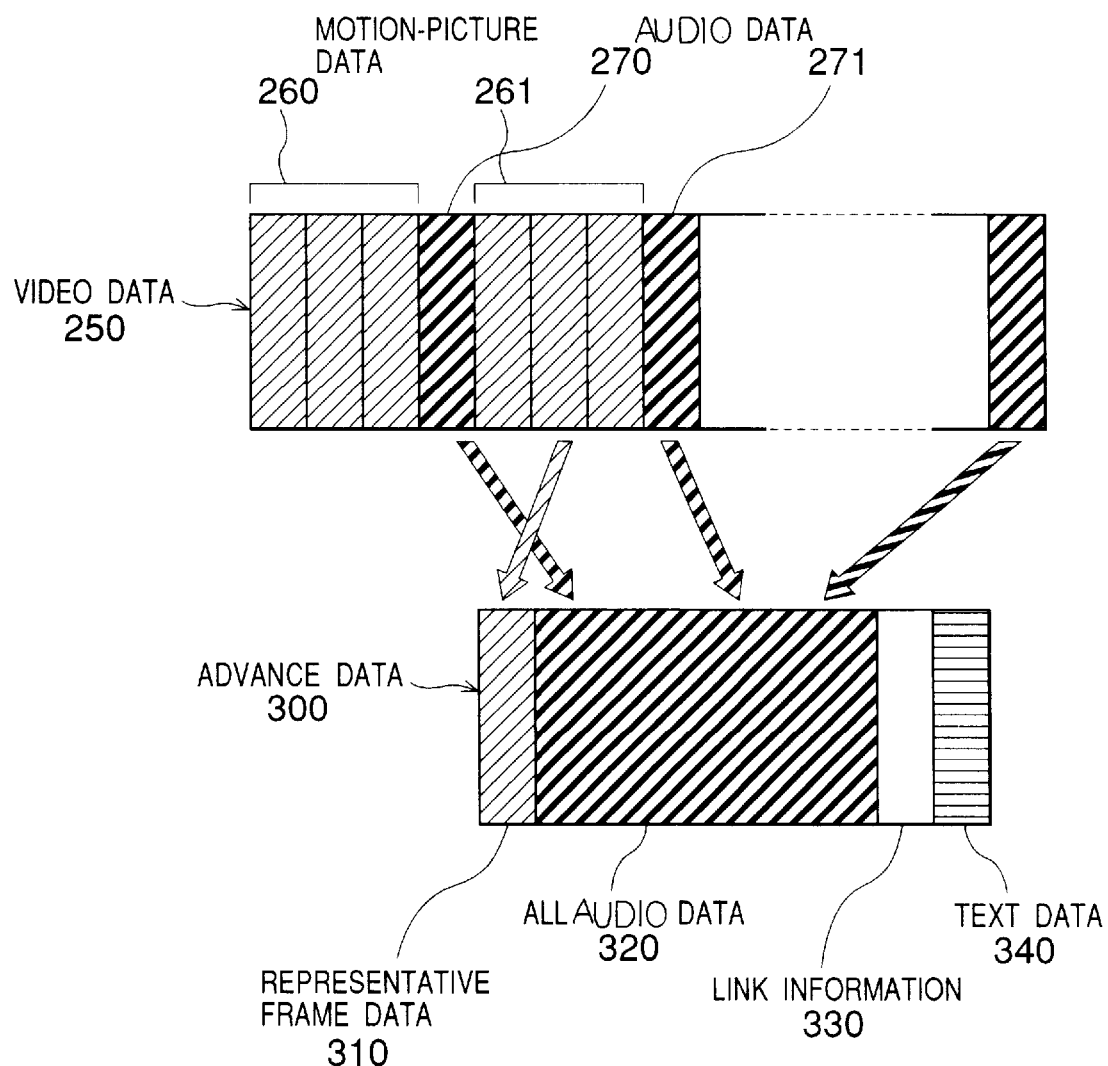
FIG. 5 is a diagram for explaining the structure of advance data in an embodiment, along with the principle of a method of creating the advance data.

As shown in FIG. 5, the compressed video data 250 in the MPEG system are formed by alternately inserting a plurality of frames of compressed motion picture frame data 260, 261 etc., and compressed audio data 270, 271 etc. for time periods which correspond respectively to the compressed motion picture frame data 260, 261 etc. The motion picture data have header information affixed to each frame, and can be distinguished from the audio data.

Since the MPEG system is stated in other literature (for example, "INTERNATIONAL STANDARDS OF MULTI-MEDIA DATA" published by Maruzen Book Store Co., Ltd.), it shall not be explained in more detail here.

As already stated, the algorithms 200 and 210 can be implemented by either hardware or software. In this embodiment, they are implemented by the compander 115.

A method of creating advance data from the compressed video data 250 of the MPEG system stated above will now be described with reference to FIG. 5.

The advance data 300 are formed containing frame data 310 representative of the motion picture, all the audio data 320, and link information 330. Also, text data 340, etc. separately created can be contained in the advance data 300. In a case where the user can fulfill communication by the use of only the video data, the text data 340 may well be omitted.

The representative frame data 310 are obtained in such a way that a frame separately designated by the user is extracted from among the motion picture frame data contained in the compressed video data 250. The designation and extraction are processed by the following steps of procedure: while the compressed video data 250 are being decoded by the MPEG decoder 210 and being displayed on the display unit 110, the user's instruction for selecting the representative frame is accepted. The selection instruction is given with the mouse 104, etc. Besides, the data which exist in the VRAM 109 at the time of the acceptance of the user's instruction, in other words, the frame data which are displayed on the display unit 110 at that time, are directly extracted as the representative frame data 310. Accordingly, the representative frame data 310 are in the status subjected to the expansion process. The details of the steps of the extraction process for the representative frame data 310 will be explained later.

All the audio data 320 are obtained by joining the compressed audio data 270, 271, etc. together. As stated before, the motion picture data of the MPEG system are endowed with the header information every frame, and hence, the motion picture data can be distinguished from the audio data. All the audio data 320 can accordingly be formed in such a way that, while the contents of the data are being checked, only the audio data are derived and united. Herein, all the audio data 320 are in the status in which the data are not subjected to the expansion process, but are left compressed.

The link information 330 indicates a corresponding relation between the advance data 300 and the compressed video data 250. Concretely, the file name, the internal ID No. or the like of the compressed video data 250 is used as the link information 330.

The text data 340 are prepared separately from the video data at need, and are joined with the above-mentioned data.

Now, the processing modules described with reference to FIG. 1 will be explained in detail.

Figure 2:
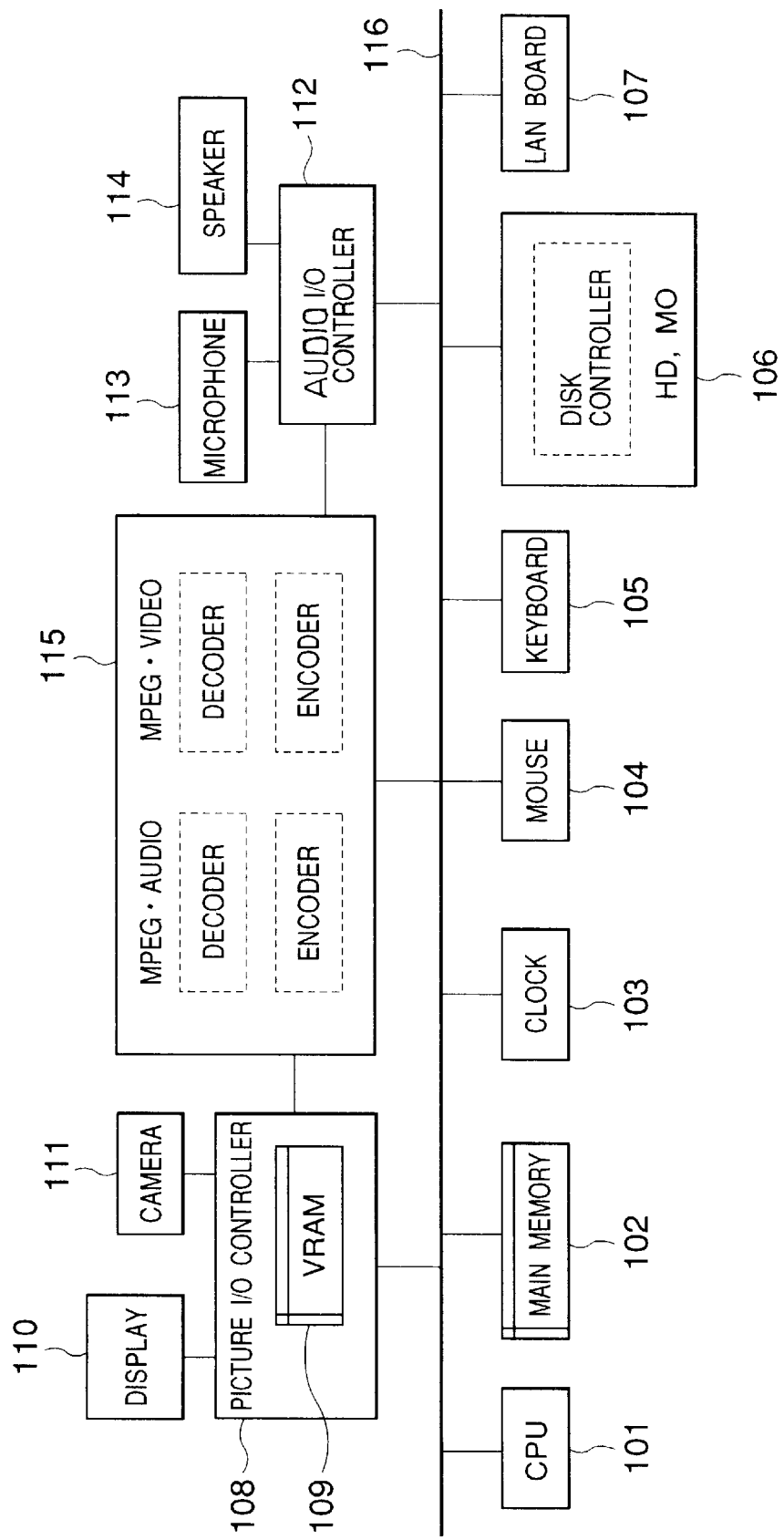
FIG. 2 is a block diagram showing the hardware construction of a video mail transmission or reception terminal in an embodiment.

The principal parts of each of the processing modules are actually implemented in such a way that the CPU 101 included in the corresponding one of the terminals 1, 3 and station 2 in FIG. 2 runs programs stored in the main memory 102. Accordingly, the processing steps of the programs which the CPU 101 runs shall be described here with reference to flow charts.

First, the video mail creation/transmission processing module 10 will be explained.

Figure 8:
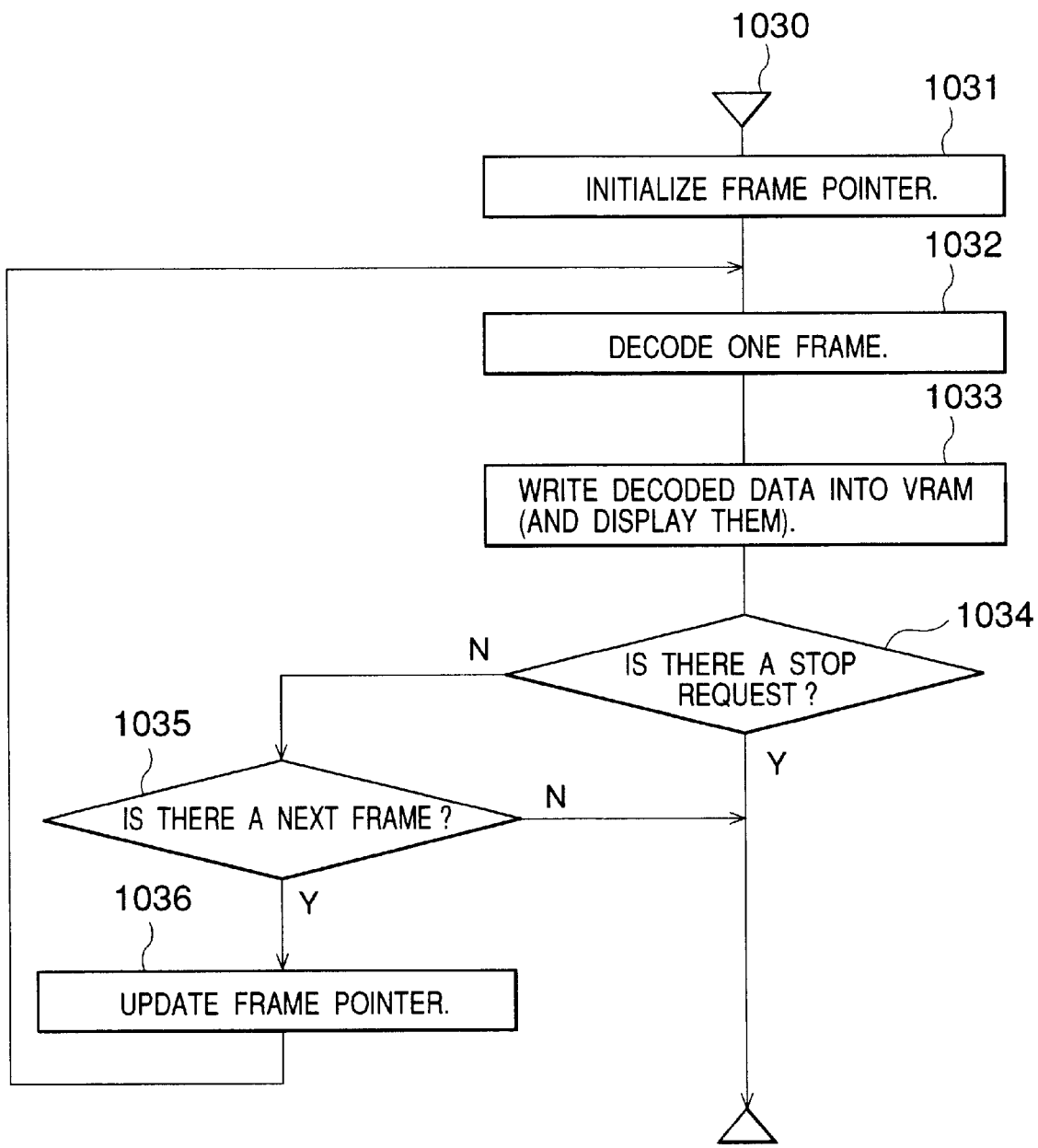
FIG. 8 is a flow chart showing a representative frame selection program which corresponds to a step 1021 in FIG. 7.

Processes for implementing the video mail creation/transmission processing module 10 are three programs; a video mail creation program 1010 (FIG. 6), a video mail transmission program 1020 (FIG. 7) and a representative frame selection program 1030 (FIG. 8). The three programs are run by the CPU 101 which is included in the video mail transmission terminal 1. These three programs proceed as respectively itemized below.

Video Mail Creation Program 1010 (refer to FIG. 6):

In transmitting an item of video mail, the user starts the video mail creation program 1010 of the video mail transmission terminal 1. Then, the CPU 101 of the terminal 1 accepts a motion picture from the camera 111 and audio from the microphone 113. Further, the CPU 101 causes the compander 115 to compress the accepted data and temporarily administers the resulting data as compressed video data 250 (shown in FIG. 5) in the main memory 102 or storage device 106 (step 1011). Incidentally, when the compander 115 is not installed, the CPU 101 itself executes the compression.

Subsequently, the user is asked to acknowledge the presence or absence of any text input (step 1012). The acknowledgement is done by, for example, presenting a predetermined display on the display unit 110 and accepting a selection instruction from the keyboard 105. In a case where, as the result of the acknowledgement, the text input is not requested, the control flow of the program 1010 proceeds to a step 1014 directly. On the other hand, in a case where the text input is requested, this text input from the keyboard 105 is accepted and saved (step 1013).

At the next step 1014, the CPU 101 accepts the input of destination information (for example, the name of a user who is a transmission goal or an addressee) from the keyboard 105.

Thereafter, the CPU 101 starts the video mail transmission process program 1020, and delivers the compressed video data 250 formed at the step 1011 and the destination information accepted at the step 1014, to the program 1020 so as to transmit the video mail item (step 1015). The video mail transmission process program 1020 will be explained with reference to FIG. 7 later.

Lastly, the CPU 101 deletes the compressed video data 250 accepted and temporarily administered at the step 1011 (step 1016). Then, the video mail creation program 1010 is ended.

Figure 6:
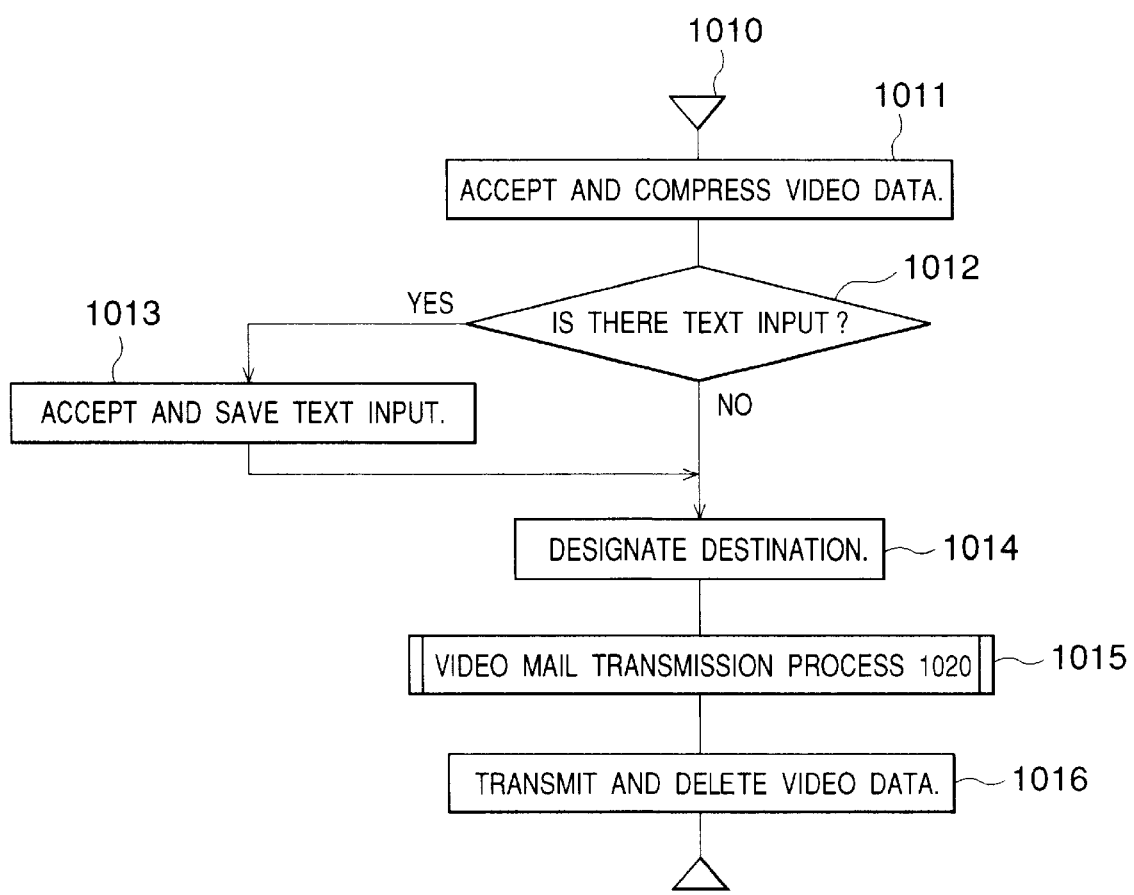
FIG. 6 is a flow chart showing a video mail creation program in an embodiment.

Video Mail Transmission Program 1020 (refer to FIG. 7):

The video mail transmission process program 1020 is started when the compressed video data 250 and the destination information of the transmission goal, which are to be transmitted, have been delivered to this program 1020 at the step 1015 of the video mail creation process program 1010 (FIG. 6).

Upon the start of the program 1020, the CPU 101 first starts the representative frame selection process program 1030 so as to determine frame data on which the representative frame data 310 of advance data 300 shown in FIG. 5 are based. Besides, the CPU 101 writes the determined frame data into the VRAM 109 (step 1021). Incidentally, the representative frame selection process 1030 determines the representative frame data 310 in compliance with an instruction given by the user. The details of the representative frame selection process 1030 will be explained with reference to FIG. 8.

The CPU 101 temporarily administers the representative frame data in the VRAM 109, in the main memory 102 or storage device 106 (step 1022). Besides, the CPU 101 separates and extracts only the compressed audio data (320) from among the compressed video data (step 1023).

Subsequently, the compressed audio data 320, representative frame data 310 and link information 330 are put together, to thereby form the advance data 300 shown in FIG. 5. In the presence of the text data 340, the text data are also joined together. Further, the advance data 300 are transmitted to the mailbox transmission/reception management module 30 through the network 4 (step 1024). Herein, before transmitting the advance data 300, the CPU 101 informs the mailbox transmission/reception management module 30 of the fact that the data to be transmitted are the advance data 300. Alternatively, the advance data 300 have information affixed to the initial part thereof, the information indicating that the pertinent data are the advance data 300, whereupon the resulting data are transmitted.

Incidentally, the mailbox transmission/reception management module 30 stores the received advance data 300 in the mailbox 50 of the user corresponding to the destination information stated before.

Thereafter, the CPU 101 of the terminal 1 sends a message for requesting divisional transmission, the destination information, etc. to the mailbox transmission/reception management module 30 (step 1025). When the CPU 101 has received a reply granting the request for divisional transmission, the CPU 101 commands the video data divisional-transmission processing module 20 to forward the compressed video data 250 in conformity with the divisional transmission (step 1026). Incidentally, the commanded video data divisional-transmission processing module 20 carries out the divisional transmission by running a video data divisional-transmission process program 1140 (refer to FIG. 12) which will be explained later.

After the run of the program 1020 shown in FIG. 7, the CPU 101 returns to the step 1016 shown in FIG. 6.

Representative Frame Selection Program 1030 (refer to FIG. 8):

The representative frame selection process program 1030 is started when the compressed video data 250 to be transmitted have been delivered to this program 1030 at the step 1021 of the video mail transmission process program 1020 (FIG. 7).

Upon the start of the program 1030, the CPU 101 first initializes a frame pointer 400 shown in FIG. 3, so as to point at the head frame data (step 1031). Subsequently, the CPU 101 causes the compander 115 (MPEG•Video decoder 211)

to decode data of one frame pointed at by the frame pointer 400 in the compressed motion picture data (step 1032). Thereafter, the CPU 101 overwrites the decoded data into the VRAM 109 (step 1033). As a result, the pertinent frame data are displayed on the display unit 110.

Subsequently, the CPU 101 decides whether or not an instruction for stopping the selection process has been entered from the mouse 104, the keyboard 105 or the like of the user (step 1034). In a case where the stopping instruction has been entered, the CPU 101 ends the processing of this program 1030. On the other hand, in a case where the instruction has not been entered, the control flow of this program 1030 proceeds to a step 1035, at which the presence or absence of the data of the next frame is decided. In the presence of the next frame data as the result of the decision, the frame pointer 400 is updated so as to point at the next frame data (step 1036). After the step 1036, the control flow returns to the step 1032, and similar processing is iterated. To the contrary, in the absence of the next frame data (that is, in a case where the motion picture frame data 410 of all the frames have been displayed), the representative frame selection program 1030 is ended. After the end of this representative frame selection program 1030, the CPU 101 returns to the step 1022 in FIG. 7.

Next, the video mail reception/reconstruction processing module 60 will be explained.

Figure 9:
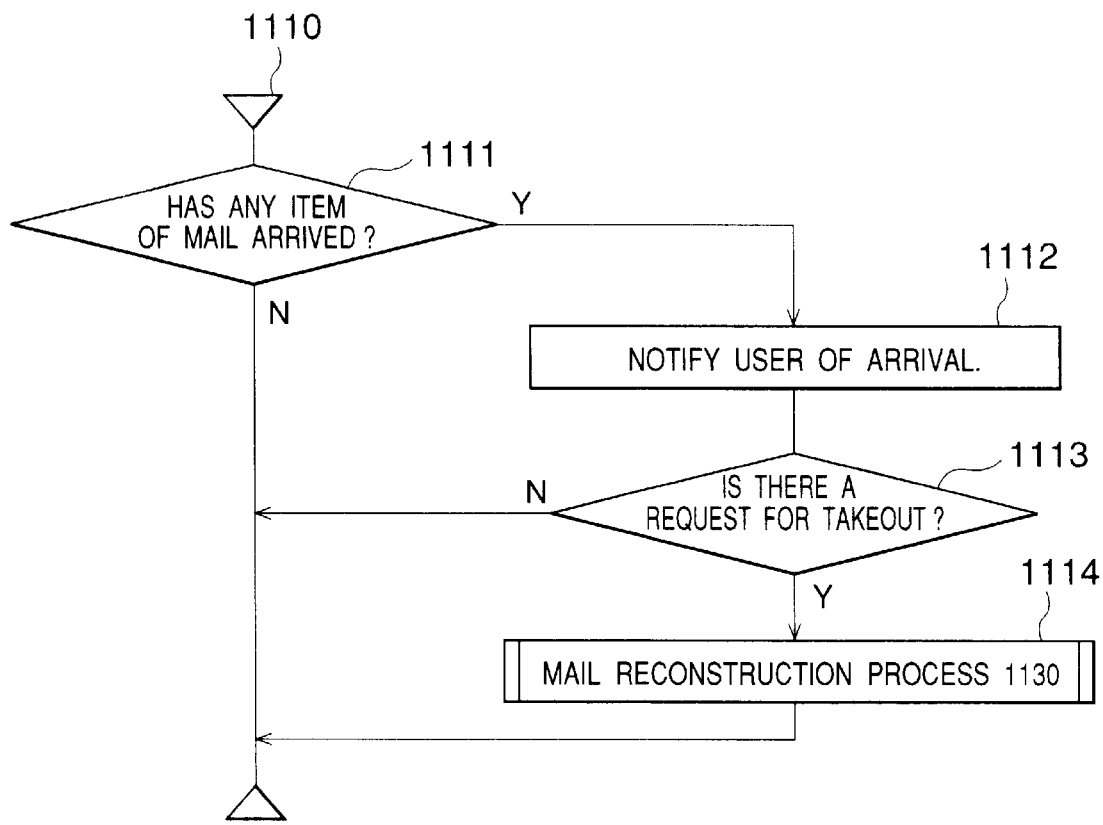
FIG. 9 is a flow chart showing a video-mail-arrival process program in an embodiment.
Figure 10:
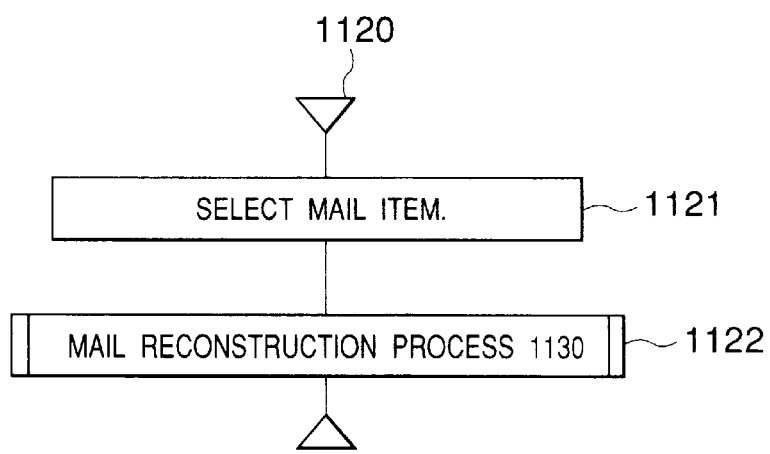
FIG. 10 is a flow chart showing a video mail opening program in an embodiment.
Figure 11:
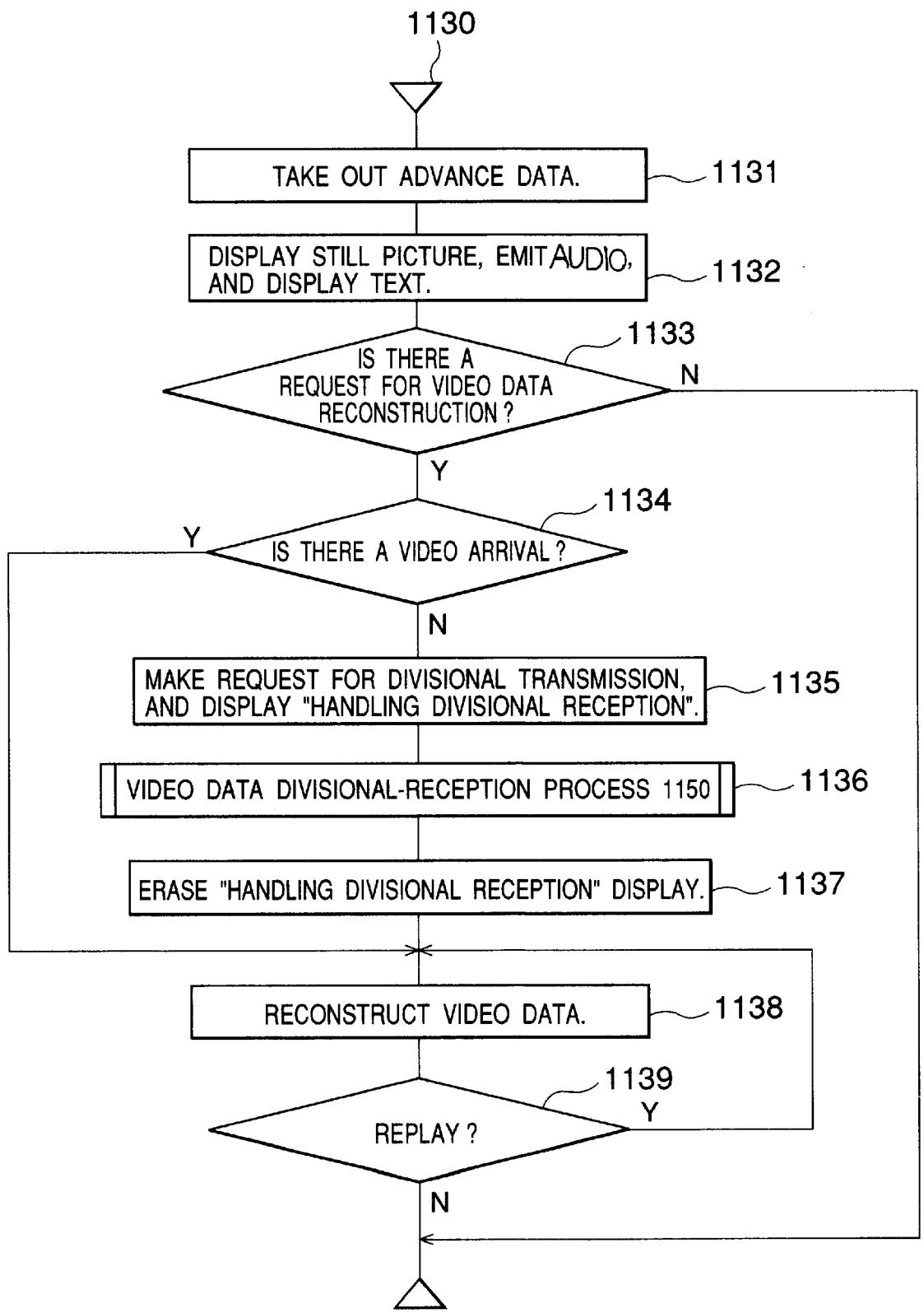
FIG. 11 is a flow chart showing a video mail reconstruction program which corresponds to a step 1114 in FIG. 9 and a step 1122 in FIG. 10.

Processes for implementing the video mail reception/reconstruction processing module 60 are three programs; a video mail arrival process program 1110 (FIG. 9), a video mail opening program 1120 for items of video mail having already arrived (FIG. 10), and a video mail reconstruction program 1130 (FIG. 11). The three programs are run by the CPU 101 which is included in the video mail reception terminal 2. They proceed as respectively itemized below.

Video Mail Arrival Process Program 1110 (FIG. 9):

The video mail arrival process program 1110 is started in compliance with an instruction given by the user.

Upon the start of the program 1110, the CPU 101 inquires of the mailbox transmission/reception management module 30 in the server station 2, as to whether or not any new item of mail has arrived for the particular user (step 1111).

The mailbox transmission/reception management module 30 inquired of replies as to whether or not any mail item directed to the particular user has arrived at the corresponding mailbox 50.

In a case where, as the result of the reply, the mail item has arrived, the CPU 101 proceeds to a step 1112, at which it notifies the user of the arrival of the mail item. The notification is done by, for example, displaying a message indicative of the arrival on the display unit 110.

Subsequently, the CPU 101 asks the user as to whether he/she wishes to take out the video mail item which has arrived (step 1113). In this case, the user can designate the mail item which is to be taken out, and enter an instruction for taking out the designated mail item, by operating the keyboard 105 or the like.

In the presence of the user's instruction for the takeout, the CPU 101 starts the mail reconstruction program 1130 so as to take out the designated mail item (step 1114). The details of the mail reconstruction program 1130 will be explained with reference to FIG. 11 later. After the completion of the reconstruction of the mail item, the CPU 101 ends the video mail arrival process program 1110.

In a case where the mail item has arrived at the step 1111 or where the takeout instruction is not given at the step 1113, the CPU 101 ends the video mail arrival process program 1110 directly.

Video Mail Opening Program 1120 (FIG. 10):

The video mail opening program 1120 is used in reconstructing or playing back an item of video mail. Whereas the video mail arrival process program 1110 stated above deals with only the items of video mail having arrived anew, the video mail opening program 1120 functions to reconstruct the video mail item which has not been watched (read) yet in spite of the acknowledgement of the arrival thereof, or to reconstruct again the video mail item which has been reconstructed before.

The video mail opening program 1120 is started in compliance with an instruction given by the user.

Upon the start of the video mail opening program 1120, the CPU 101 requests the mailbox transmission/reception management module 30 to send a list of mail items which are addressed to the particular user and which are stored in the corresponding mailbox 50. The mailbox transmission/reception management module 30 sends the list of the mail items in response to the request. Upon receiving the list, the CPU 101 displays it on the display unit 110 and waits for the designation of the arrival mail item to-be-opened (step 1121). Herein, the user can enter an instruction for designating the mail item to-be-opened and taking out the designated mail item, through the keyboard 105 or the like. When thus instructed, the CPU 101 proceeds to a step 1122.

At the step 1122, the CPU 101 starts the mail reconstruction program 1130 so as to take out the designated mail item. The details of the mail reconstruction program 1130 will be explained with reference to FIG. 11. After the completion of the reconstruction, the CPU 101 ends the video mail opening program 1120.

Video Mail Reconstruction Program 1130 (FIG. 11):

The video mail reconstruction program 1130 is started at the step 1114 of the video mail arrival program 1110 (FIG. 9) or at the step 1122 of the video mail opening process program 1120 (FIG. 10).

Upon the start of the video mail reconstruction program 1130, the CPU 101 requests the mailbox transmission/reception management module 30 to take out the advance data 300 of the mail item designated by the user (step 1131). In compliance with the request, the mailbox transmission/reception management module 30 takes out the advance data 300 from the mailbox 50 and sends the advance data to the video mail reception/reconstruction processing module 60 of the terminal 3.

Upon receiving the advance data 300, the CPU 101 causes the display unit 110 to display representative frame data 310 contained in the advance data 300, as a still picture. In addition, the CPU 101 causes the compander 115 (MPEG•Audio decoder 212) to expand compressed audio data 320 and causes the speaker 114 to emit the resulting audio data (step 1132). Besides, when text data are contained in the advance data 300, the text data are also displayed.

Subsequently, the CPU 101 checks whether or not an instruction for reconstructing video data correspondent to the advance data 300 has been entered by the user (step 1133). Herein, the user can enter the reconstruction instruction through the keyboard 105 or the like. In the presence of the reconstruction instruction as the result of the check, the CPU 101 proceeds to a step 1134. This time, the CPU 101 decides whether or not divisional transmission data containing compressed video data 250 correspondent to the advance data 300 exist in the storage device 106 of the terminal 3. The decision is rendered with link information 330 as a clue, this information being contained in the advance data 300 which was taken out at the step 1131. The reason for rendering such a decision is that, as already stated, in this embodiment, the advance data 300 taken out from the video mail server 2 are not saved in the video mail reception terminal 3, whereas the divisional transmission data once taken out from the video mail server 2 are saved in the video mail reception terminal 3.

In a case where the compressed video data 250 do not exist as the result of the decision at the step 1134, the CPU 101 proceeds to a step 1135, at which the CPU 101 delivers the link information 330 (for example, the file name of the compressed video data 250) to the mailbox management module 30 and makes a request for the divisional transmission of the compressed video data 250 (this request corresponds to the "request for execution of divisional transmission" in the appended claims). In addition, the CPU 101 causes the display unit 110 to display a message informing the user of the fact that divisional reception is proceeding.

Thereafter, the CPU 101 causes the video data divisional-reception processing module 40 to receive the compressed video data 250 (step 1136). Incidentally, the video data divisional-reception processing module 40 carries out the divisional reception by running a video data divisional-reception process program 1150 (FIG. 13) which will be explained later.

After the completion of the reception of the compressed video data 250, the CPU 101 erases the display of the operation of the divisional reception (step 1137) and proceeds to a step 1138.

By the way, in a case where the terminal 3 already has the compressed video data 250 at the step 1134, the CPU 101 proceeds to the step 1138 directly.

At the step 1138, the CPU 101 causes the compander 115 (MPEG decoder 210) to execute expansion processing for the compressed video data 250. Further, it functions to reconstruct or play back the expanded video data. More specifically, the motion picture data are displayed on the display unit 110 by the picture I/O controller 108. On the other hand, the audio data are emitted from the speaker 114 by the audio I/O controller 112. It is needless to say that, on this occasion, the motion picture and the audio are reconstructed in synchronism with each other.

After the completion of the reconstruction processing, the CPU 101 accepts a replay request made by the user (step 1139). In the presence of the replay request, the step 1138 is executed again. In the absence of the replay request, the CPU 101 ends the video mail reconstruction program 1130.

In the absence of the reconstruction instruction at the step 1133, the CPU 101 ends the video mail reconstruction program 1130 directly.

By the way, in the case where the reconstruction program 1130 was started at the step 1114 of the video mail arrival program 1110 (FIG. 9), the CPU 101 thereafter returns to the arrival program 1110 and ends this program 1110 directly. Likewise, in the case where the reconstruction program 1130 was started at the step 1122 of the video mail opening program 1120 (FIG. 10), the CPU 101 thereafter returns to the opening program 1120 and ends this program 1120 directly.

Now, the video data divisional-transmission processing module 20 and the video data divisional-reception processing module 40 will be explained.

Figure 12:
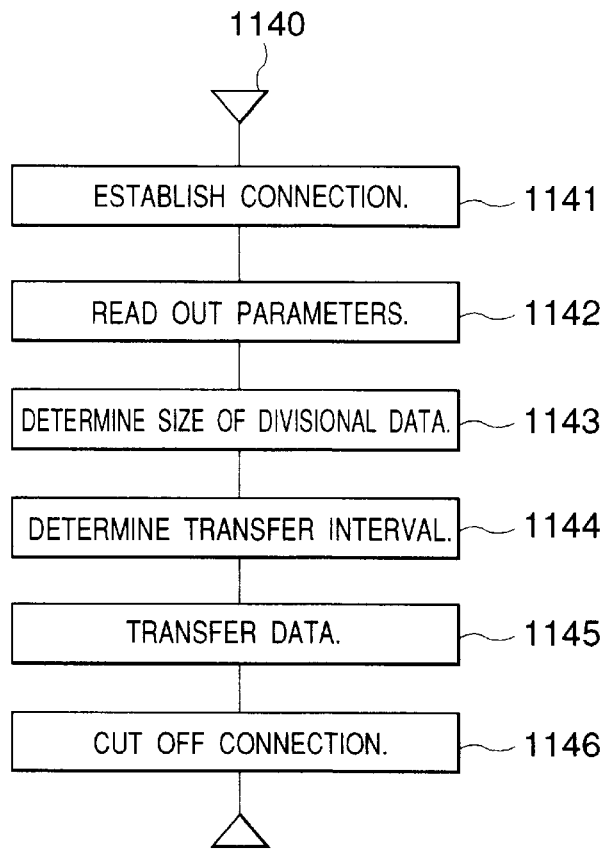
FIG. 12 is a flow chart showing a divisional transmission process program which corresponds to a step 1026 in FIG. 7.
Figure 14A:
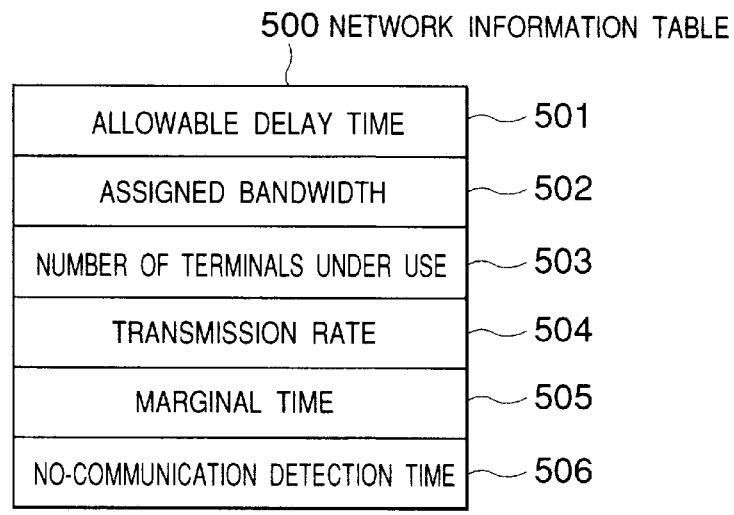
FIGS. 14A and 14B are diagrams showing the data structures of network information parameters for use in an embodiment.
Figure 14B:
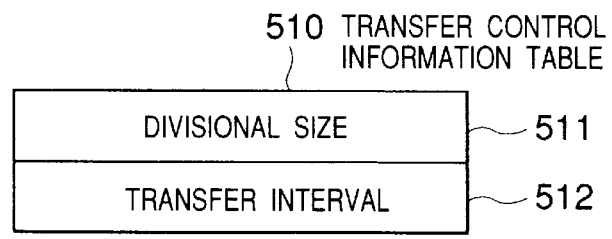

A process for implementing the video data divisional-transmission processing module 20 is the video data divisional-transmission process program 1140 (FIG. 12). This program 1140 is run by the CPU 101 included in the video mail transmission terminal 1, and by the CPU 101 included in the mailbox server station 2. The data structures of network information parameters etc. which are set and referred to in running the video data divisional-transmission process program 1140, are shown in FIGS. 14A and 14B.

Figure 13:
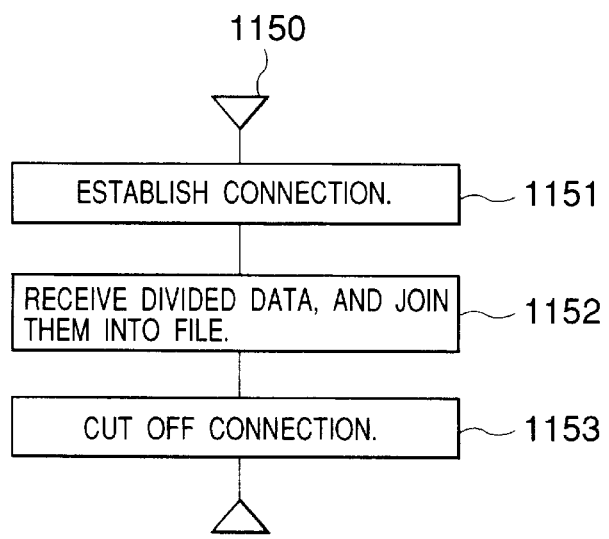
FIG. 13 is a flow chart showing a divisional reception process program which corresponds to a step 1136 in FIG. 11.

On the other hand, a process for implementing the video data divisional-reception processing module 40 is the video data divisional-reception process program 1150 (FIG. 13). This program 1150 is run by the CPU 101 included in the video mail reception terminal 3, and by the CPU 101 included in the mailbox server station 2.

The divisional transmission processing is basically executed between the video data divisional-transmission processing module 20 on the transmission side running the divisional-transmission process program 1140 and the video data divisional-reception processing module 40 on the reception side running the video data divisional-reception process program 1150.

First, the video data divisional-transmission process program 1140 (FIG. 12) will be explained.

In the video mail transmission terminal 1, the video data divisional-transmission process program 1140 is started at the step 1026 of the video mail transmission process program 1020 (FIG. 7). In the mailbox server station 2, the program 1140 is started at the step 1213 of a mailbox management program 1210 (FIG. 16) which will be explained later. Incidentally, the step 1213 is executed upon receiving the divisional-transmission request from the video mail reception terminal 3 (refer to the step 1136 of the video mail reconstruction program 1130 shown in FIG. 11).

Irrespective of whether the program 1140 is started by the step 1026 or the step 1213, information (for example, a file name) for identifying the divisional-transmission data to be transmitted is delivered as a parameter to this program 1140. By the way, the information which is delivered as the parameter here may be the link information 330 of the advance data 300.

Upon the start of the video data divisional-transmission process program 1140, the CPU 101 first establishes the connection of the terminal 1 or the station 2 with the video data divisional-reception processing module 40 of the opposite transmission party (here, the station 2 or the terminal 3) in order to execute the transmission processing of data (step 1141).

Subsequently, the CPU 101 reads out the network information parameters necessary for the divisional-transmission processing, from a network information table 500 to be explained with reference to FIG. 14A later (step 1142). Using the network information parameters, the CPU 101 determines the divisional size of the data and the transfer time interval thereof and then stores the determined values in a transfer control transmission bandwidth 502 has a predetermined value which is peculiar to the network 4. Accordingly, the user may preset this parameter 502 at, e. g., the setup of the system.

The number of terminals under use 503 indicates the number of sets of the terminal equipment or system constituents (1, 2 and 3) which are carrying out the divisional transmission through the network 4 at the particular point of time. This parameter 503 is updated by the CPU 101 of the terminal equipment having the table 500, when the connection has been established at the step 1141 of the divisional-transmission process program 1140 (FIG. 12) and when the connection has been cut off at the step 1146.

The transmission rate 504 indicates a data transmission rate which is uniquely determined by the network 4 employed.

The no-communication detection time 506 serves to decide whether or not the network 4 is used, and it corresponds to a so-called "interframe gap". The terminal equipment judges the network 4 as being idle, for the first time when the CPU 101 has confirmed that data are not transmitted and received through the network 4 for a time period which is not shorter than the no-communication detection time 506. This parameter 506 has a predetermined value which is peculiar to the network 4. Accordingly, the user may preset this parameter 506 at, e. g., the setup of the system.

Incidentally, the table 500 can be accessed by all the terminal equipment (1, 2 and 3) connected to the network 4, and the table 500 may be set in any of the terminal equipment. In this regard, in a case where such tables 500 are located in two or more of the terminal equipment, the contents thereof need to agree at any time.

The divisional size (511) and the transfer interval (512) which are respectively determined at the steps 1143 and 1144 of the divisional-transmission process program 1140 (FIG. 12), are stored in the transfer control information table 510 (refer to FIG. 14B) which is held in each individual terminal equipment.

The divisional size 511 indicates a size by which the large quantity of data (the divisional-transmission data) to be transferred is divided. This information 511 is determined in conformity with the following formula, by the use of the allowable delay time 501, transmission rate 504 and marginal time 505 stated above:

$$d_p = \frac{V_L \cdot (t_c - t_e)}{8}$$

where $d_p$ [bytes]: divisional size (511), $V_L$ [bits/sec]: transmission rate (504) of the communication medium, $t_c$ [sec]: allowable delay time (501), and $t_e$ [sec]: other marginal time (505).

Incidentally, although the marginal time 505 in the above formula need not always be considered, it should more preferably be considered for determining the divisional size 511. Naturally, a case of the marginal time 505=0 (zero) affords the maximum value of the divisional size 511. The "maximum data size" in the appended claims corresponds to the divisional size 511 in the case where the marginal time 505=0 is held in the above formula. Besides, in this embodiment, the divisional size 511 corresponds to the "quantity of data $d_p$ which the divisional transmission means sends by each of a plurality of operations" in the appended claims.

The transfer interval 512 indicates a time interval at which each of the individual data blocks obtained by dividing the divisional-transmission data by the divisional size 511 is transferred. This information 512 is computed in conformity with the following formula, by the use of the assigned bandwidth 502, divisional size 511, number of terminals under use 503, and no-data-communication detection time 506 of the communication medium as stated above:

$$t_d = t_i + 8 \cdot d_p \cdot \frac{C}{V_d}$$

where $t_d$ [sec]: transfer interval (512), $V_d$ [bits/sec]: assigned bandwidth (502), $d_p$ [bytes]: divisional size (511), C [sets]: number of terminals under use (503), and $t_i$ [sec]: no-data-communication detection time of the communication medium (506).

By the way, the method of determining the divisional size and the transfer interval explained here is detailed in Japanese Patent Application No. 6-131961 separately filed by the same applicants as those of the present application.

Next, the mailbox transmission/reception management module 30 will be explained.

Figure 15:
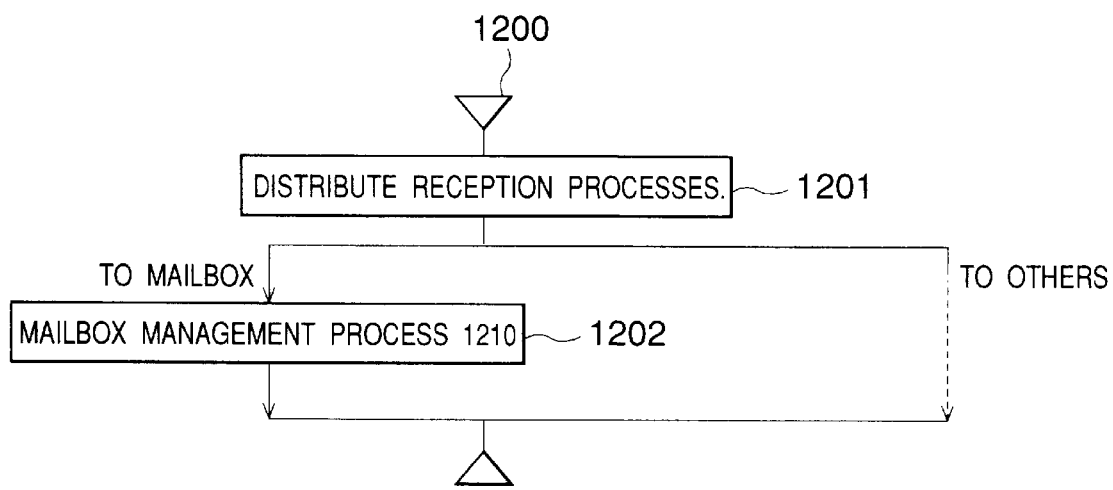
FIG. 15 is a flow chart showing a reception handler program in an embodiment.
Figure 16:
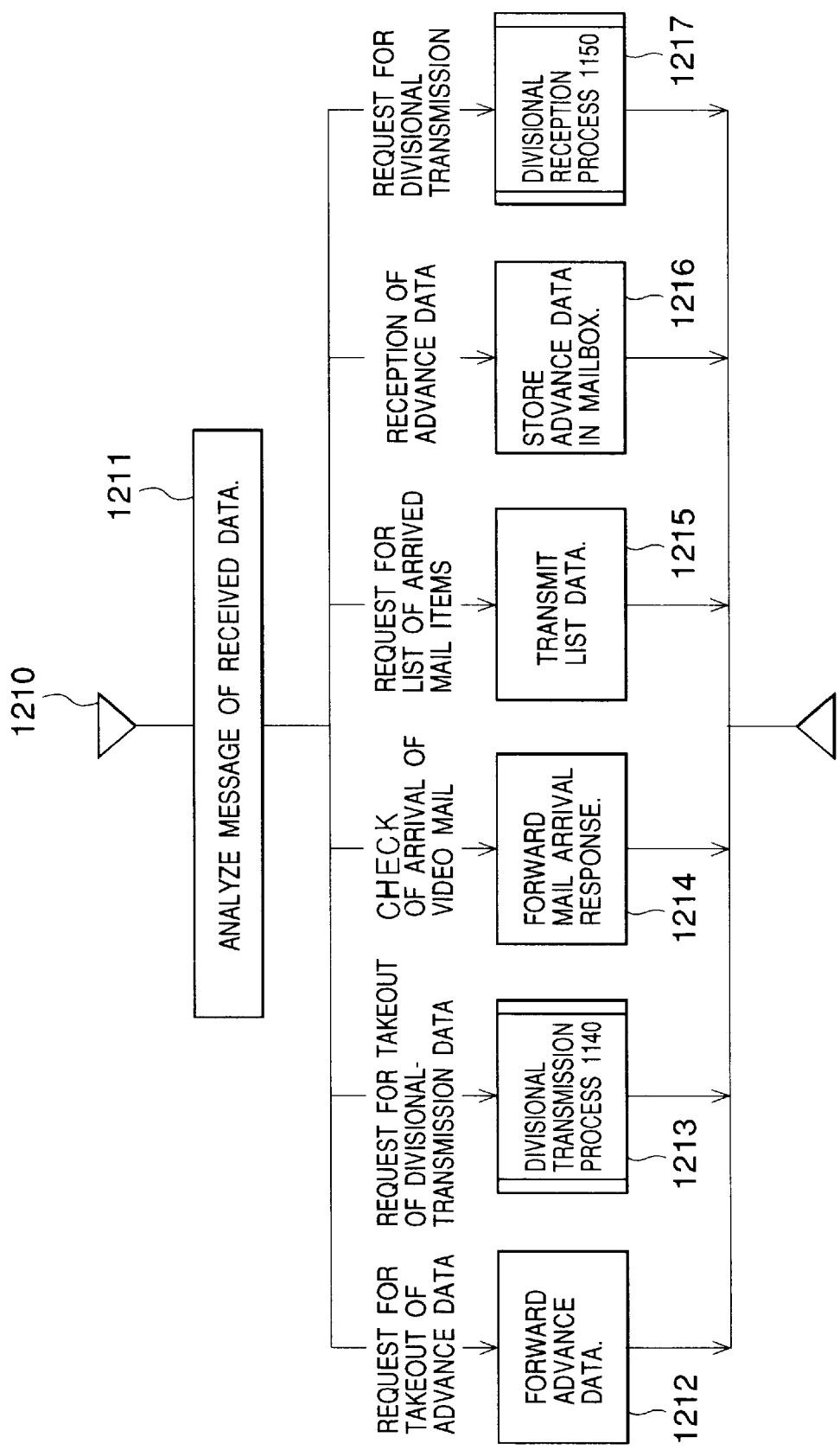
FIG. 16 is a flow chart showing a mailbox management program which corresponds to a step 1202 in FIG. 15.

Processes for implementing the mailbox transmission/reception management module 30 are a reception process handler program 1200 (FIG. 15) and the mailbox management program 1210 (FIG. 16). The two programs are run by the CPU 101 which is included in the mailbox server station 2. The programs proceed as respectively itemized below.

Reception Process Handler Program 1200 (FIG. 15):

The reception handler program 1200 is started with a momentum at the interrupt of data reception through the network 4.

Upon the start of the reception handler program 1200, the CPU 101 decides which of the programs to run in the server station 2 the content of the data of the pertinent reception is directed to (step 1201). On condition that the data are directed to the mailbox management program 1210, the CPU 101 requests this program 1201 to process the data (step 1202). Regarding the data directed to any other program, the CPU 101 similarly requests the corresponding program to process the data.

Thereafter, the CPU 101 ends the program 1200.

Mailbox Management Program 1210 (FIG. 16):

The mailbox management program 1210 is started at the step 1202 of the reception handler program (FIG. 15).

Upon the start of the mailbox management program 1210, the CPU 101 analyzes a received content (step 1211). Subsequently, the CPU 101 executes any of steps 1212~1217 in accordance with the result of the analysis.

In a case where the received content is the request for taking out the advance data in the video mail reconstruction program 1130 (refer to the step 1131 in FIG. 11), the CPU 101 proceeds to the step 1212, at which the advance data 300 of the request are forwarded to the terminal 3 by the conventional transmission method.

In a case where the received content is the request for taking out the divisional-transmission data, from the video mail reception/reconstruction processing module 60 (refer to the step 1135 of the video mail reconstruction program 1130 shown in FIG. 11), the CPU 101 proceeds to the step 1213, at which the video data divisional-transmission program 1140 (FIG. 12) is started to execute the divisional transmission.

In a case where the received content is the request for checking the video mail arrival, from the video mail reception/reconstruction processing module 60 (refer to the step 1111 of the video mail arrival process program 1110 shown in FIG. 9), the CPU 101 proceeds to the step 1214, at which a message on the presence or absence of any video mail item having arrived anew is forwarded to the video mail reception/reconstruction processing module 60.

In a case where the received content is the request for accepting the data of the list of the video mail items having arrived, from the video mail reception/reconstruction processing module 60 (refer to the step 1121 of the video mail opening program 1120 shown in FIG. 10), the CPU 101 proceeds to the step 1215, at which the list data of the video mail items addressed to the user inquired of are transmitted.

In a case where the received content is the reception of the advance data (refer to the step 1024 of the video mail transmission program 1020 shown in FIG. 7), the destination information of the advance data being also contained, from the video mail creation/transmission processing module 10, the CPU 101 proceeds to the step 1216, at which the advance data sent in are received. Besides, the CPU 101 stores the received advance data in the mailbox 50 which corresponds to the destination.

In a case where the received content is the request for executing the divisional transmission (refer to the step 1025 of the video mail transmission program 1020 shown in FIG. 7), the destination information of the divisional transmission being also contained, from the video mail creation/transmission processing module 10, the CPU 101 proceeds to the step 1217, at which the video data divisional-reception program 1150 is started to execute the divisional reception of the divisional-transmission data. Besides, the CPU 101 stores the received data in that mailbox 50 of the user which corresponds to the destination.

After having executed any of the above steps 1212~1217, the CPU 101 ends the mailbox management program 1210.

As thus far described, according to this embodiment, only the advance data are sent in advance. The video data chiefly composed of the motion picture are thereafter sent by the divisional transmission in accordance with the divisional size and the transfer interval which are determined in order to guarantee the communication qualities (for example, the allowable delay time and the limited available bandwidth) of the network. It is therefore possible to realize the transfer of video mail which can compatibly cope with urgency and relieve the load on the network.

Moreover, in order to introduce the video mail system of this embodiment into an existing computer network system, the construction for the divisional transmission may merely be installed in only terminal equipment which need the video mail functions. Thus, the data transfer of video mail can be realized without hampering data transmissions which are based on network applications in the prior art, especially the data transmission of which the real-time property is required. Accordingly, the present invention is also advantageous in point of cost.

In this embodiment, in view of the nature of the video mail, the advance data are formed of the representative frame data, audio data and text data, and the divisional-transmission data are formed of the video data. However, the types of data to constitute the advance data are not restricted to the above. Which data are to be sent in advance, may be determined by such factors as urgency, a priority level and a data quantity. Alternatively, it may be determined in consideration of the trade-off of various factors. Likewise, the type of data to constitute the divisional-transmission data is not restricted, either. By way of example, only one representative frame is used in this embodiment. It is also allowed, however, that a plurality of frames can be selected. This aspect can be readily implemented by, for example, permitting the representative frame selection program 1030 to be run a plurality of times.

Besides, in this embodiment, the audio data are contained in both the advance data and the divisional-transmission data. It is also allowed, however, that the audio data are not contained in the divisional-transmission data. In this case, when the video data are to be reconstructed in the reception terminal, the audio data which are contained in and sent by the advance data need to be synchronized with the motion picture data which are contained in and sent by the divisional-transmission data. Therefore, information for indicating the temporal positional relationship between the audio data and the motion picture data is affixed to the advance data (or the divisional-transmission data).

Further, in this embodiment, entire audio data are contained in the advance data, but only part of the audio data may well be contained in the advance data. In this case, the audio data may be simultaneously reconstructed or played back at the stage of selecting the representative frame data, thereby permitting the user to designate that range of the audio data which is to be contained in the advance data. Naturally, the two contrivances explained here may well be combined.

Still further, the present invention is applicable even in case of transmitting only the motion picture data or only the audio data.

Regarding the selection of the representative frame, the user directly selects an image displayed on the screen of the display unit, and hence, the operation of the selection is easy. Besides, data in the VRAM 109 are directly utilized as the representative frame data. With this method, the representative frame data are formed of the decoded data and are therefore independent of the compression system for the motion picture data, such as the MPEG system. Accordingly, this method is applicable even in a case where compressed motion picture data conforming to such a system as vector quantization or an international standard "H. 261" are adopted as the data of the video mail.

In this embodiment, the still picture lying at the predetermined position (the last frame of the motion picture data) is automatically selected only in the case where the representative frame data have not been selected by the user. It is also allowed, however, that a still picture lying at such a position is automatically selected as the representative frame from the beginning. Regarding the position for the automatic selection, the first still picture is also considered. The standard "first" or "last" of the still pictures constituting the motion picture as explained here, is an example of the "position of data to be extracted" which is used as the criteria of extraction by the "extraction means", in the appended claims.

In this embodiment, while the divisional-transmission data (in the foregoing, the compressed video data 250) are being transferred as the divided data blocks, the user is informed of the proceeding of the divisional transmission by presenting a display on the display unit to that effect. Therefore, even in a case where the divisional transmission is carried out as, for example, the background processing of the terminal, the user is prevented from feeling uneasy because of the unknown end timing of the transfer.

Also in this embodiment, the divisional-transmission data are divided into the blocks of predetermined size, and the respective blocks are thereafter transferred by the plurality of separate operations. It is not always required, however, to previously divide the divisional-transmission data into the blocks in this manner. By way of example, it is also allowed to iterate processing in which the transfer is started without dividing the divisional-transmission data and is ended when the data have been sent a predetermined quantity (size), and in which the transfer is restarted from the data succeeding the data transferred by the last operation, after the lapse of a predetermined time interval.

The method of the present invention in which the transfer modes conforming to the data types are properly used, or the divisional-transmission method thereof, is also applicable to various systems other than the system of this embodiment. When it is applied to, for example, the data transfer between a CPU and a device such as memory in a computer terminal, a bus traffic neck can be eliminated.

This embodiment has been described on the video mail system which is constructed including the video mail transmission terminal 1, mailbox server station 2 and video mail reception terminal 3. The present invention, however, is also applicable to a case where video mail is forwarded from the video mail transmission terminal 1 to the video mail reception terminal 3 directly without the intervention of the mailbox server station 2. The transmission terminal 1 and the reception terminal 3 may well be connected by a dedicated transmission line. In this case, the link information 330 need not always be contained in the advance data 300. The advance data may well be associated with the divisional-transmission data which have been received immediately after the reception of the advance data. The "network" in the appended claims signifies a concept which covers also such a dedicated transmission line connecting the two equipment. Even in case of employing an ordinary LAN or the like, the link information 330 need not be contained in the advance data 300 when a predetermined name is given to the divisional-transmission data.

In this embodiment, the link information 330 indicates the divisional-transmission data. However, in a case where the divisional-transmission data are formed of a plurality of sorts of contents being manageable separately from one another, ID's directly indicating the data files of the contents may well be utilized. By way of example, in a case where the divisional-transmission data are formed of video data and text data, information indicative of the file of the video data and information indicative of the file of the text data are afforded as the link information. In this case, each of the information indicative of the file of the video data and the information indicative of the file of the text data corresponds to the "link information" in the appended claims. Thus, the request for divisional transmission between the server 2 and the reception terminal 3, and the divisional transmission complying with the request, can be made for each of the contents which constitute the divisional-transmission data. As a result, a receiver or an addressee who requires only the video data can take out only them, so that the traffic and communication cost of the network can be reduced still more.

The present invention has been made with the principal intention of sending video mail, video data etc. by the use of an existing network. However, even when applied to a high-speed network which will be actualized in the future, the present invention can produce specific effects. By way of example, since the minimum required data are sent in advance, the usage of the present invention resembling present-day direct mail is also considered. Herein, data which state the outlines of typical commodities are sent as the advance information to unspecified consumers. Thereafter, the divisional-transmission data may well be sent to only the consumers who desire more detailed explanations. In this case, according to the present invention, the contents of the advance data can be easily altered properly in accordance with the consumers. Moreover, curtailment in cost can be attained by confining the traffic of the data to the required minimum.

In a case where the video mail reception terminal is realized as a portable information terminal, it is also allowed that the advance data and the divisional-transmission data are not saved. Thus, the large-capacity storage device 106 or the like for saving the video data etc. is dispensed with in the portable information terminal, and the device can be reduced in size, in cost and in power consumption.

According to the present invention, in a case where the application of video mail or the like transmitting large quantities of data is to be introduced into an existing computer network system, it is possible to provide a data transfer system for the video mail in which the video mail does not hamper the data transmissions of hitherto network applications, particularly the data transmission requiring a real-time property, and which can cope with the urgency of the mail.

What is claimed is:

1. A data transmission device by which data to-be-transmitted composed of one or more sorts of data are transmitted to a data reception device connected with the data transmission device through a network, comprising:

extraction means for extracting some of the data to-be-transmitted according to a predetermined criteria;

advance data creation means for creating advance data which are formed containing the data extracted by said extraction means;

transmission means for transmitting the advance data to the data reception device; and divisional transmission means for separately transmitting divisional transmission data to said data reception device by a plurality of operations at time intervals each of which is expanded up to a time greater than a possible minimum transfer interval, such that said data transmission device allows another data transmission device in the network to transmit data in said time interval, the divisional transmission data containing data which are not contained in said advance data in spite of being contained in said data to-be-transmitted.

2. A data transmission device as defined in claim 1, wherein said advance data contain, in addition to the extracted data, link information which specifies the divisional transmission data corresponding to said advance data.

3. A data transmission device as defined in claim 1, wherein:

said data to-be-transmitted contain data of a motion picture which is formed containing data of a plurality of still pictures; and the extracted data contain some of the still picture data.

4. A data transmission device as defined in claim 1, wherein:

said data to-be-transmitted contain video data which are formed containing data of a motion picture and data of audios, the motion picture being formed containing data of a plurality of still pictures; and the extracted data contain the audio data and some of the still picture data.

5. A data transmission device as defined in claim 1, wherein the predetermined criteria is stipulated containing at least one of a type of data to be extracted, a position of the data to be extracted, and selection by a user of said data transmission device.

6. A data transmission device as defined in claim 5, further comprising selection means for accepting the selection by the user.

7. A data transmission device as defined in claim 6, wherein:

said data to-be-transmitted contain data of a motion picture which is formed containing data of a plurality of still pictures; and said selection means reproduces the motion picture data to present motion picture to said user, and accepts from said user said selection of at least one of the still pictures which are contained in the presented motion picture.

8. A data transmission device as defined in claim 1, further comprising divisional-transmission-request acceptance means for accepting a request for divisional-transmission of data, from said data reception device;

said divisional transmission means starting the divisional transmission of said divisional transmission data in a case where said divisional-transmission-request acceptance means has accepted the request for divisional-transmission of data.

9. A data transmission device as defined in claim 1, wherein a quantity of data which said divisional transmission means sends by each of the plurality of operations in the divisional transmission is, at most, a predetermined maximum data size.

10. A data transmission device as defined in claim 9, wherein said predetermined maximum data size is a minimum packet size which is defined in a communication specification of the network.

11. A data transmission device as defined in claim 9, further comprising data size determination means for determining said quantity of data to be sent by said each operation, on the basis of the following formula:

$$d_p = \frac{V_L \cdot (t_c - t_e)}{8}$$

where $d_p$: quantity of data to be sent by said each operation (in bytes), $V_L$: transmission rate of the network (in bits/sec), $t_c$: predetermined allowable time of delays in communications which are made through said network (in sec), and $t_e$: marginal time which is preset by a user of said data transmission device (in sec), under a condition of $t_e > 0$.

12. A data transmission device as defined in claim 1, further comprising transfer interval determination means for determining the transfer interval on the basis of the following formula:

$$t_d = t_i + 8 \cdot d_p \cdot \frac{C}{V_d}$$

where $t_d$: transfer interval (in sec), $V_d$: assigned transmission bandwidth of the network as is available for said divisional transmission (in bits/sec), dp: quantity of data which said divisional transmission means sends in said each operation (in bytes), C: number of data transmission devices which are concurrently transmitting the divisional transmission data at a predetermined time point obtained separately (in sets), and $t_i$: time period for which no data communication of said network is detected.

13. A data reception device for receiving data which are sent from the data transmission device connected with the data reception device, through a network, as defined in claim 1, comprising:

reception means for receiving the advance data which are sent from said transmission means of said data transmission device;

divisional reception means for receiving the data which said divisional transmission means of said data transmission device sends separately by the plurality of operations, and for putting the received data together to re-form the divisional transmission data; and memory means for storing the re-formed divisional transmission data therein.

14. A data reception device for receiving data which are sent from the data transmission device connected with the data reception device, through a network, as defined in claim 2, comprising:

reception means for receiving the advance data which are sent from said transmission means of said data transmission device;

divisional reception means for receiving the data which said divisional transmission means of said data transmission device sends separately by the plurality of operations, and for putting the received data together to re-form the divisional transmission data; and memory means for storing the re-formed divisional transmission data therein.

15. A data reception device for receiving data which are sent from the data transmission device connected with the data reception device, through a network, as defined in claim 3, comprising:

reception means for receiving the advance data which are sent from said transmission means of said data transmission device;

divisional reception means for receiving the data which said divisional transmission means of said data transmission device sends separately by the plurality of operations, and for putting the received data together to re-form the divisional transmission data; and reconstruction means for reconstructing or playing back the motion picture data and the still picture data.

16. A data reception device for receiving data which are sent from the data transmission device connected with the data reception device, through a network, as defined in claim 4, comprising:

reception means for receiving the advance data which are sent from said transmission means of said data transmission device;

divisional reception means for receiving the data which said divisional transmission means of said data transmission device sends separately by the plurality of operations, and for putting the received data together to re-form the divisional transmission data; and reconstruction means for reconstructing or playing back the still picture data, the motion picture data and the audio data.

17. A data reception device as defined in claim 16, wherein when reconstructing or playing back the audio data contained in the advance data, said reconstruction means is capable of displaying the still picture data contained in said advance data, concurrently with the reconstruction or play back of said audio data.

18. A data reception device as defined in claim 14, further comprising divisional-transmission request means for sending to said data transmission device a request for divisional transmission of the divisional transmission data which correspond to the advance data received from said data transmission device.

19. A data reception device as defined in claim 18, wherein in sending the request for divisional transmission, said divisional-transmission request means sends also the link information contained in said advance data.

20. A data reception device as defined in claim 18, further comprising:

reconstruction instruction acceptance means for accepting an instruction from a user for reconstructing or playing back the motion picture data which correspond to the advance data received in advance;

save means for saving the divisional transmission data; and control means;

said divisional reception means storing the re-formed divisional transmission data in said save means;

said control means deciding if said divisional transmission data corresponding to said advance data exist in said save means, when said reconstruction instruction acceptance means has accepted the instruction for reconstructing or playing back said motion picture data; so that subject to the nonexistence of said divisional transmission data in said save means, said control means causes said divisional-transmission request means to send the request for divisional transmission to said data transmission device and thereafter causes said reconstruction means to reconstruct or play back said motion picture data contained in said divisional transmission data received by said divisional reception means; whereas subject to the existence of said divisional transmission data in said save means, said control means causes said reconstruction means to reconstruct or play back said motion picture contained in said divisional transmission data in said save means.

21. A data reception device as defined in claim 20, further comprising transfer-state notification means for notifying that said divisional transmission data are being received, to a user of said data reception device for a time period from the sending of the divisional transmission request by said divisional-transmission request means until completion of the reception of said divisional transmission data by said divisional reception means.

22. A video mail system wherein video mail is transferred from a transmission terminal to a reception terminal through a server station;

the transmission terminal comprising:
  extraction means for extracting still picture data according to a predetermined criteria, the still picture data being some of motion picture data contained in the video mail to-be-transmitted;
  advance data creation means for creating advance data which are formed containing the still picture data extracted by said extraction means, and link information for specifying the motion picture data corresponding to said still picture data;
  transmission means for transmitting the advance data to the server station; and
  divisional transmission means for separately transmitting divisional transmission data to said reception terminal by a plurality of operations, the divisional transmission data containing said motion picture data of the video mail to-be-transmitted;

said server station comprising:
  reception means for receiving said advance data which are sent from said transmission means of said transmission terminal;
  divisional reception means for receiving data which said divisional transmission means of said transmission terminal sends separately by the plurality of operations, and for putting the received data together to re-form said divisional transmission data;
  memory means for storing the re-formed divisional transmission data therein, along with the corresponding advance data;
  transmission means for transmitting said advance data to said server station in response to a request sent from the reception terminal; and
  divisional transmission means for separately transmitting said re-formed divisional transmission data in said memory means, to said reception terminal by a plurality of operations in response to a request made by a user of said reception terminal at time intervals each of which is expanded up to a predetermined time greater than a possible minimum transfer interval, such that said data transmission device allows another data transmission device in the network to transmit data in said time interval;

said reception terminal comprising:
  first request means for requesting said server station to transmit said advance data;
  reception means for receiving said advance data which are sent from said transmission means of said server station;
  still picture reconstruction means for reconstructing or playing back the still picture which is contained in the received advanced data;
  means for inquiring of the user as to if the user desires reception of the motion picture corresponding to said still picture, during the reconstruction or play back of said still picture;
  second request means for requesting said server station to transmit said divisional transmission data which contain said motion picture data corresponding to said still picture, in a case where said user desires the reception of said motion picture;
  divisional reception means for receiving data which said divisional transmission means of said server station sends separately by the plurality of operations in response to a request from said second request means, and for putting the received data together to re-form said divisional transmission data;
  memory means for storing the re-formed divisional transmission data therein; and
  motion picture reconstruction means for reconstructing or playing back the motion picture data stored in said memory means.

23. A video mail system as defined in claim 22, wherein:
said transmission means included in said transmission terminal sends destination information indicating the user who is to receive the advance data, along with said advance data;
said memory means included in said server station stores said advance data and the destination information in association with each other therein;
said reception terminal further includes arrival check means for inquiring as to if the video mail directed to the user exists in said memory means; and
said server station further includes arrival reply means for verifying if said video mail directed to said user exists in said memory means, and for sending a result of the verification to said reception terminal as a reply, in a case where the inquiry is received.

24. A video mail system as defined in claim 22, wherein the video mail also contains audio data, said extraction means extracts the audio data in addition to the still picture data, and said advance data creation means adds said audio data to the advance data.

25. A data transfer method of transferring data to-be-transmitted which are composed of data of one or more types of contents, comprising the steps of:
  extracting some of the data contained in the data to-be-transmitted, according to a predetermined criteria;
  creating advance data formed containing the extracted data, and sending the advance data to a transfer destination in advance; and
  thereafter sending divisional transfer data separately by a plurality of operations at time intervals each of which is expanded up to a predetermined time greater than a possible minimum transfer interval, such that other data can be transmitted in said time interval, the divisional transfer data containing data which are not contained in said advance data in spite of being contained in said data to-be-transmitted.

26. A data transfer method as defined in claim 25, wherein said advance data contain link information which specifies the divisional transfer data corresponding to said advance data, in addition to the extracted data.

27. A data transfer method as defined in claim 25, wherein:

said data to-be-transmitted contain data of a motion picture which is formed containing data of a plurality of still pictures; and said extracted data are formed containing some of the still picture data.

28. A data transfer method as defined in claim 25, wherein:

said data to-be-transmitted contain video data which are formed containing data of a motion picture and data of audios, the motion picture being formed containing data of a plurality of still pictures; and said extracted data are formed containing the audio data a nd some of the still picture data.

29. A data transfer method as defined in claim 25, wherein the pre determined standard is stipulated containing at least one of a type of data to be extracted , a position of the data to be extracted, and selection by a user of said data transfer method.

30. A video mail transfer method of transferring video mail which contains, at least, data of a motion picture formed containing data of a plurality of still pictures, comprising the step of:

extracting some of the still picture data contained in the motion picture data;

creating advance data which are formed containing, at least, the extracted still picture data, and link information indicating the video data, said still picture data belonging to said video data;

transferring the advance data and destination information in advance, the destination information designating that user of said video mail transfer method who is to receive said advance data; and thereafter transferring data separately by a plurality of operations at time intervals each of which is expanded up to a predetermined time greater than a possible minimum transfer interval, such that other data can be transmitted in said time interval, the data containing data which are not contained in said advance data in spite of being contained in the video mail.

* * * * *